(12) United States Patent
Zhao et al.

(10) Patent No.: US 7,316,227 B2
(45) Date of Patent: Jan. 8, 2008

(54) TEMPERATURE-CONTROLLED PCV VALVE

(75) Inventors: Ken Zhao, West Roxbury, MA (US); Matthew Fratantonio, Northborough, MA (US); Wayne R. Duprez, Waltham, MA (US)

(73) Assignee: Standard-Thomson Corporation, Waltham, MA (US)

(*) Notice: Subject to any disclaimer, the term of this patent is extended or adjusted under 35 U.S.C. 154(b) by 146 days.

(21) Appl. No.: 11/275,802

(22) Filed: Jan. 30, 2006

(65) Prior Publication Data

US 2006/0180132 A1  Aug. 17, 2006

Related U.S. Application Data

(60) Provisional application No. 60/705,359, filed on Aug. 4, 2005, provisional application No. 60/649,045, filed on Feb. 1, 2005.

(51) Int. Cl.
*F02B 25/06* (2006.01)

(52) U.S. Cl. .......................................... 123/574; 251/11

(58) Field of Classification Search .................. 138/37, 138/40–46; 251/11, 118, 12; 123/574; 137/504
See application file for complete search history.

(56) References Cited

U.S. PATENT DOCUMENTS

| | | | |
|---|---|---|---|
| 3,165,097 A * | 1/1965 | Lowther | ..................... 123/574 |
| 3,263,660 A | 8/1966 | Hyde | |
| 3,359,960 A | 12/1967 | Pittsley | |
| 3,709,204 A | 1/1973 | Noponen | |
| 3,766,898 A | 10/1973 | McMullen | |
| 4,483,309 A | 11/1984 | Norman et al. | |
| 4,540,153 A * | 9/1985 | Gomi et al. | ................... 251/11 |
| 4,625,703 A | 12/1986 | Otto et al. | |
| 4,715,403 A | 12/1987 | Szlaga | |
| 4,793,372 A | 12/1988 | Gauthier et al. | |
| 5,024,203 A | 6/1991 | Hill | |
| 5,586,541 A * | 12/1996 | Tsai | ........................... 123/574 |
| 5,697,351 A | 12/1997 | Schumacher | |
| 6,640,793 B1 | 11/2003 | Kabat et al. | |
| 6,807,958 B2 | 10/2004 | Kabat et al. | |
| 7,017,564 B2 | 3/2006 | Duprez et al. | |

OTHER PUBLICATIONS

Prior Art Toyota Motor Sales, U.S.A., Inc. Brochure, "Emission Sub Systems—Positive Crankcase Ventilation System," pp. 1-5, date unknown.

* cited by examiner

*Primary Examiner*—Marguerite McMahon
(74) *Attorney, Agent, or Firm*—Barnes & Thornburg LLP

(57) ABSTRACT

A positive crankcase ventilation valve includes a flow restrictor movable in an orifice to vary flow of fumes from an engine crankcase to an intake manifold in a vehicle. The valve also includes a temperature-activated element for moving the flow restrictor in the orifice.

37 Claims, 13 Drawing Sheets

TEMPERATURE-CONTROLLED PCV VALVE

This application claims priority under 35 U.S.C. § 119(e) to U.S. Provisional Application Ser. No. 60/649,045, filed Feb. 1, 2005 and U.S. Provisional Application Ser. No. 60/705,359, filed Aug. 4, 2005, which are expressly incorporated by reference herein.

BACKGROUND

The present disclosure relates to vehicle engines, and particularly to apparatus for venting fumes present in an engine crankcase. More particularly, the present disclosure relates to a Positive Crankcase Ventilation (PCV) valve having a variable-flow orifice.

A PCV valve helps control pollution from vehicles by returning crankcase fumes to the engine's intake manifold to be mixed with incoming filtered combustion air and inducted into the cylinders of the engine. A mixture of crankcase fumes, air, and fuel then is combusted in the engine cylinders during a combustion cycle to power the vehicle engine. Thus, the crankcase fumes are burned and not just discharged into the atmosphere.

During a normal compression stroke of an engine piston in an engine cylinder providing a combustion chamber, a small amount of gases in the combustion chamber escapes past the piston and enters the crankcase. Such "blowby" gases include unburned fuel that can dilute and contaminate engine oil, cause corrosion to engine parts, and contribute to sludge build up in the engine. PCV valves cooperate to remove these blowby gases from the crankcase and combine them with the engine's normal incoming air/fuel mixture before such a mixture is burned in the engine.

SUMMARY

A positive crankcase ventilation (PCV) valve includes a flow restrictor that is arranged to move in a flow-metering orifice to change the flow rate of fuel vapor fumes exhausted from an engine crankcase to an engine intake manifold when the engine "switches" from an "idling" mode to a "wide-open throttle" mode. In illustrative embodiments, the PCV valve includes a temperature-activated memory element made of a shape-memory alloy. The temperature-activated memory element is linked to the flow restrictor to cause the flow restrictor to move in the flow-metering orifice and relative to the temperature-activated memory element to change the effective size of the flow-metering orifice in response to heating and expansion of the temperature-activated memory element.

A PCV valve in accordance with a first embodiment of the present disclosure includes a flow restrictor that is movable in a flow-metering orifice formed in a stationary partition wall provided in an interior region of a PCV valve housing to vary flow of crankcase fumes passing through the flow-metering orifice. A PCV valve in accordance with a second embodiment of the present disclosure includes a flow restrictor that is movable in a flow-metering orifice formed in a movable shuttle that is raised and lowered in an interior of a PCV valve housing to vary flow of crankcase fumes passing through the flow-metering orifice.

In illustrative embodiments, flow restrictor locator means is provided in the PCV valve for relocating the flow restrictor in the flow-metering orifice to different positions as a function of: (1) engine throttle valve position (e.g., idle or wide-open) and (2) crankcase fuel vapor temperature (e.g., cold at cold-engine start and hot during hot-running operation). The flow restrictor locator means is arranged to lie in the interior region of the PCV valve housing and is coupled to the flow restrictor and to the PCV valve housing.

In illustrative embodiments, the flow restrictor locator means includes a temperature-responsive position changer and a pressure-responsive lift reducer. In operation, the position changer uses a "temperature" input to move the flow restrictor in the flow-metering orifice to account for temperature of crankcase fumes admitted into the PCV valve housing. At the same time, the lift reducer uses a "differential pressure" input to move the flow restrictor in the flow-metering orifice to account for a differential pressure applied to top and bottom portions of the flow restrictor as crankcase fumes flow through the PCV valve housing without substantially disturbing movement of the flow restrictor engineered by the temperature-responsive position changer.

In illustrative embodiments, the temperature-responsive position changer includes a temperature-activated element made of a shape-memory alloy, which element reacts to temperature in the PCV valve, and an over-ride spring that is arranged to oppose the temperature-activated element. The temperature-responsive position changer provides means for changing the position of the flow restrictor in the flow-metering orifice in response to temperature changes of exhaust fumes extant in the interior region of the PCV valve housing. The temperature-activated element is heated to compress the over-ride spring and cooled to allow expansion of the over-ride spring to move the flow restrictor up and down in the PCV valve housing relative to a stationary flow-metering orifice without changing the position of the flow-metering orifice in the PCV valve housing.

In illustrative embodiments, the pressure-responsive lift reducer includes a coiled compression spring arranged to apply a yieldable force urging the flow restrictor in a downward direction toward an inlet opening formed in the PCV valve housing to receive fumes from an engine crankcase. In a first illustrative embodiment, the pressure-response lift reducer is coupled to the flow restrictor and to a movable shuttle included in the temperature-responsive position changer and interposed between the temperature-activated element and the over-ride spring. In a second illustrative embodiment, the pressure-responsive lift reducer is coupled to the flow restrictor and to a stationary interior wall located in the PCV valve housing.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a schematic view of a portion of the vehicle engine system of FIG. 1 along with an enlarged sectional view of the PCV valve of FIG. 2 after assembly and showing the flow restrictor located in a first position in a flow-metering orifice formed in the stationary partition wall to increase flow of low-temperature fuel vapor from the crankcase to the intake manifold when the engine is "cold" and the throttle valve is arranged to cause the engine to "idle";

FIG. 4 is an illustration similar to FIG. 3 showing the flow restrictor located in a second position in the flow-metering orifice formed in the stationary partition wall to decrease flow of high-temperature fuel vapor from the crankcase to the engine intake manifold when the engine is "hot" and the throttle valve is arranged to cause the engine to idle;

FIG. 5 is an illustration similar to FIGS. 3 and 4 showing the flow restrictor located in third position in the flow-metering orifice formed in the stationary partition wall to increase flow of low-temperature fuel vapor from the crankcase to the engine intake manifold when the engine is cold and the throttle valve is "wide open";

FIG. 6 is an illustration similar to FIGS. 3-5 showing the flow restrictor located in a fourth position in the flow-metering orifice formed in the stationary partition wall to decrease flow of high-temperature fuel vapor from the crankcase to the intake manifold when the engine is hot and the throttle valve is wide open;

FIG. 9 is a schematic view of a portion of the vehicle engine system of FIG. 1 along with an enlarged sectional view of the PCV valve of FIG. 8 after assembly and showing the flow restrictor located in a first position in a flow-metering orifice formed in the movable shuttle to increase flow of low-temperature fuel vapor from the crankcase to the engine intake manifold when the engine is "cold" and the throttle valve is arranged to cause the engine to "idle";

FIG. 10 is an illustration similar to FIG. 9 showing the flow restrictor located in a second position in the flow-metering orifice formed in the movable shuttle to decrease flow of high-temperature fuel vapor from the crankcase to the engine intake manifold when the engine is "hot" and the throttle valve is arranged to cause the engine to idle;

FIG. 11 is an illustration similar to FIGS. 9 and 10 showing the flow restrictor located in third position in the flow-metering orifice formed in the movable shuttle to increase flow of low-temperature fuel vapor from the crankcase to the engine intake manifold when the engine is cold and the throttle valve is "wide open"; and FIG. 12 is an illustration similar to FIGS. 9-11 showing the flow restrictor located in a fourth position in the flow-metering orifice formed in the movable shuttle to decrease flow of high-temperature fuel vapor from the crankcase to the engine intake manifold when the engine is hot and the throttle valve is wide open.

DETAILED DESCRIPTION

Figure 1A:
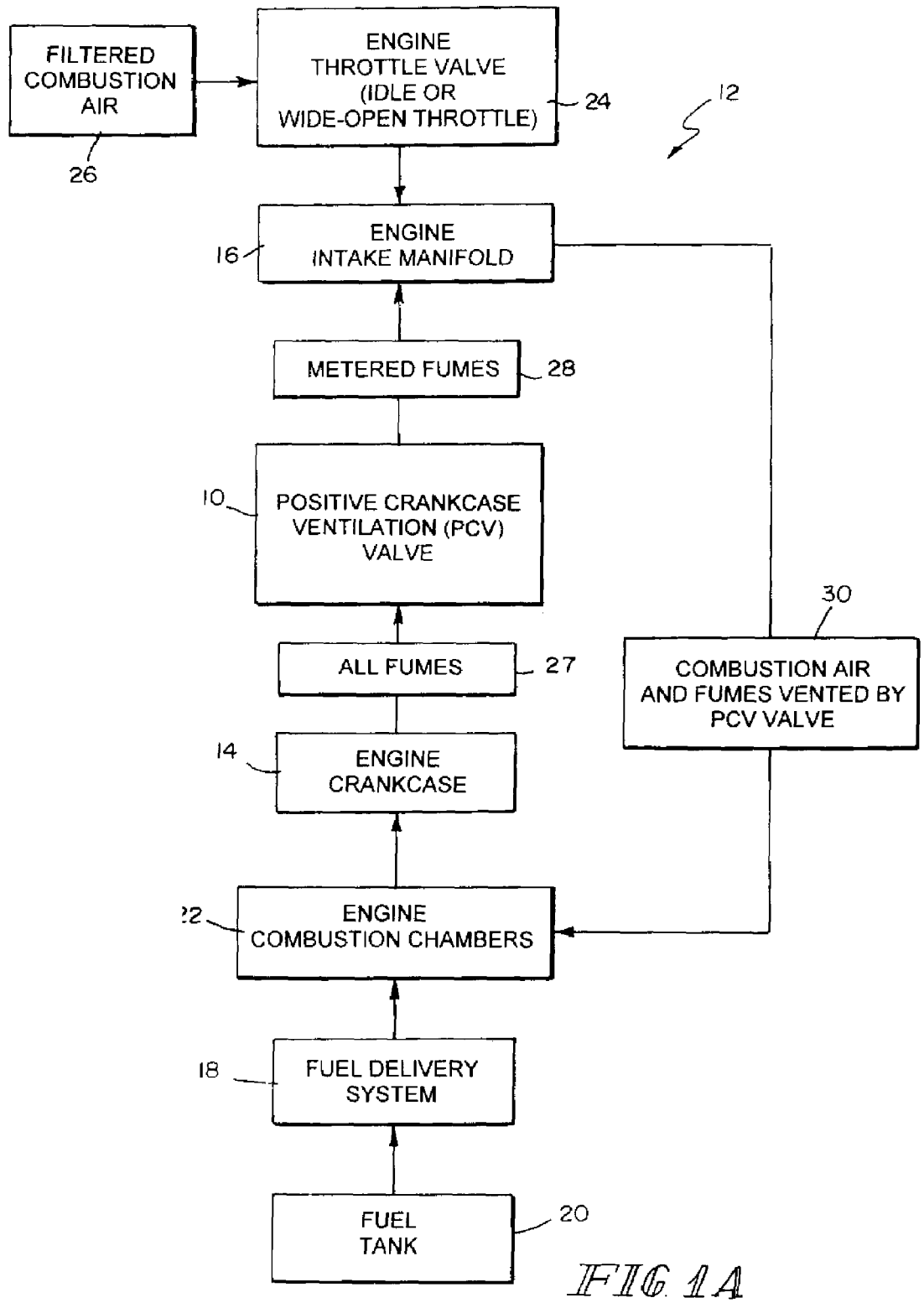
FIG. 1A is a schematic view of a vehicle engine system including a Positive Crankcase Ventilation (PCV) valve in accordance with the present disclosure.

A positive crankcase ventilation (PCV) valve 10 is included in an engine 12 shown diagrammatically in FIG. 1A. PCV valve 10 controls the flow of fuel vapor fumes from engine crankcase 14 to engine intake manifold 16. The PCV valve 10 in accordance with the present disclosure is configured to (A) sense whether the engine is (1) idling or running at wide-open throttle and (2) cold (such as during engine start-up) or hot and then (B) change the flow rate of fuel vapor fumes exhausted from engine crankcase 14 and delivered to engine intake manifold 16 in accordance with predetermined performance criteria as suggested, for example, in connection with a first embodiment wherein a flow-metering orifice 39 is formed in a stationary wall 38 included in a PCV valve housing as shown, for example, in FIGS. 3-6 and in connection with a second embodiment wherein a flow-metering orifice 239 is formed in a movable shuttle 250 mounted for movement in a PCV valve housing as shown, for example, in FIGS. 9-12.

In the block diagram illustrated in FIG. 1A, engine 12 also includes a fuel delivery system 18 for delivering fuel as needed from fuel tank 20 to engine combustion chambers 22. An engine throttle valve 24 is manipulated by an engine operator to regulate flow of filtered combustion air 26 into engine intake manifold 16. PCV valve 10 receives all fumes 27 discharged from engine crankcase 14 and then discharges a metered flow of fumes 28 into engine intake manifold 16 to mix with filtered combustion air 26 passing through engine intake manifold 16. A mixture 30 of filtered combustion air 26 and fumes 28 vented by PCV valve 10 is inducted from engine intake manifold 16 into engine combustion chambers 22 to mix with fuel delivered by fuel delivery system 18 to create a combustible air-fuel mixture that is burned in engine combustion chambers 22 during operation of engine 12. It is within the scope of this disclosure to use PCV valve 10 in any suitable engine system. Reference is made to U.S. Pat. No. 6,640,793 for disclosure relating to a valve assembly and method for controlling flow of gases from an engine crankcase to an engine intake manifold, which disclosure is hereby incorporated by reference herein.

Figure 1B:
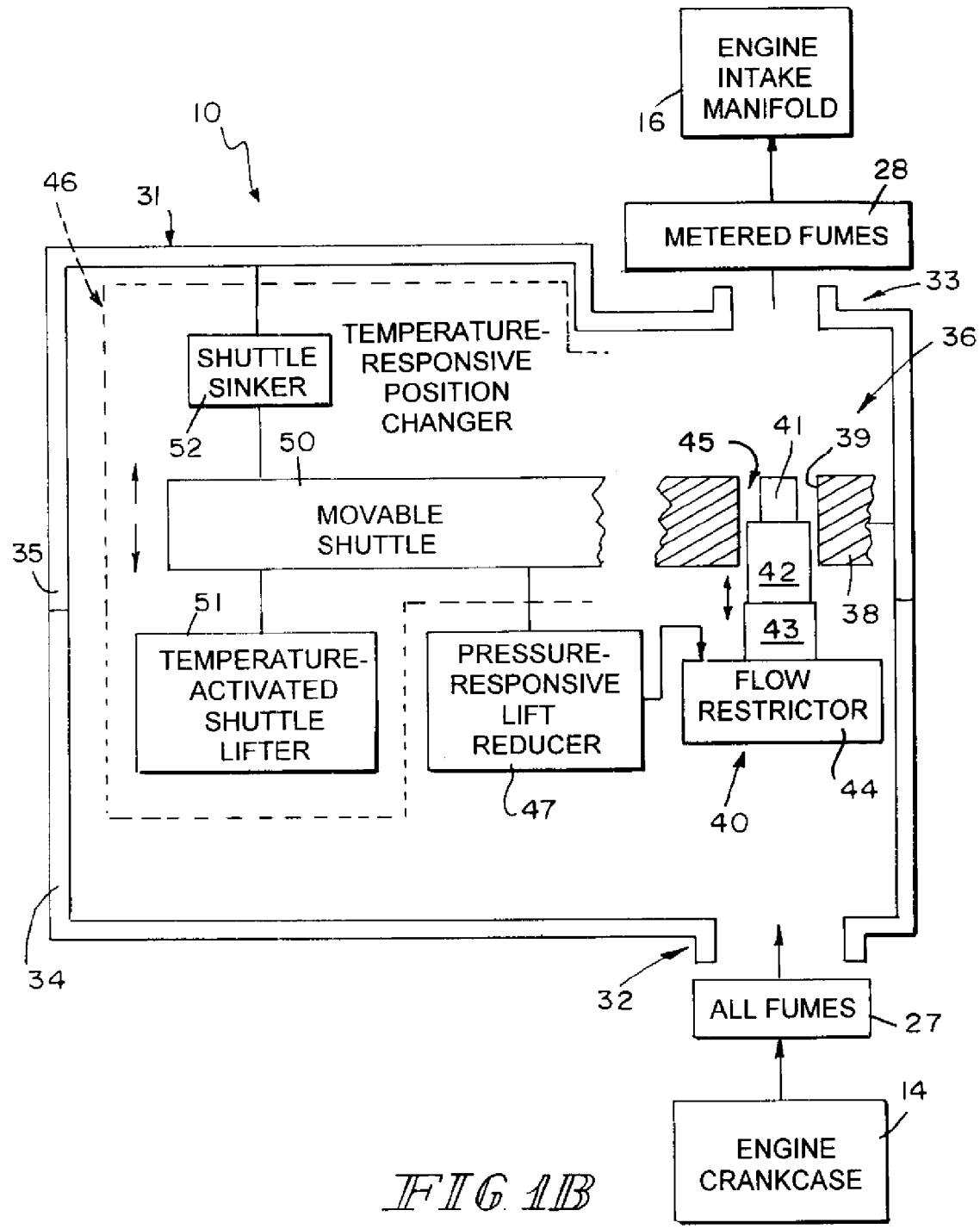
FIG. 1B is a schematic view of components included in the PCV valve of FIG. 1A showing a "three-stage" flow restrictor mounted for movement in a PCV valve housing to regulate flow of crankcase fumes through a flow-metering orifice formed in a stationary partition wall included in the valve housing, a temperature-responsive (flow restrictor) position changer comprising a movable shuttle, a temperature-activated shuttle lifter, and a shuttle sinker, and a pressure-responsive (flow restrictor) lift reducer linking the flow restrictor to the movable shuttle and suggesting that the position changer and lift reducer cooperate to move the flow restrictor in the flow-metering orifice to locate either a small-diameter first stage, an intermediate-diameter second stage, or a large-diameter third stage in the "stationary" flow-metering orifice as a function of temperature and pressures extant in the PCV valve housing.

In the block diagram illustrated in FIG. 1B, a PCV valve 10 in accordance with a first embodiment of the disclosure includes a shell 31 formed to include an inlet 32 coupled to engine crankcase 14 to receive crankcase fumes 27 and an outlet 33 for discharging metered fumes 28 to engine intake manifold 16. Illustratively, a lower valve housing 34 including inlet 32 cooperates with an upper valve housing 35 including outlet 33 to form shell 31 as suggested diagrammatically in FIG. 1B.

PCV valve 10 also includes a flow restrictor 40 (e.g., pintle) located in an interior region 36 of shell 31 and mounted for movement in a flow-metering orifice 39 formed in a stationary partition wall 38 located in shell 31. Flow restrictor 40 includes a small-diameter, first-stage control portion 41, an intermediate-diameter, second-stage control portion 42, a large-diameter, third-stage control portion 43, and a base 44 as suggested in FIG. 1B. The flow rate of crankcase fumes 27 through flow-metering orifice 39 is established by the position of flow restrictor 40 in flow-metering orifice 39 relative to stationary partition wall 38 in shell 31 as shown in FIGS. 3-6.

Stationary partition wall 38 includes an interior border edge defining orifice 39 and providing a first flow-metering surface bordering orifice 39. Flow restrictor 40 extends into orifice 39 as suggested in FIG. 1B and control portions 41, 42, and 43 cooperate to provide a second flow-metering surface (on the exterior of flow restrictor 40). That second flow-metering surface cooperates with the opposing first flow-metering surface to define a variable flow-metering channel 45 therebetween. The effective size of flow-metering channel 45 is varied by up-and-down movement of flow restrictor 40 in orifice 39 owing, in part, to the varying cross-sectional dimensions of control portions 41, 42, and 43 of flow restrictor 40.

A temperature-responsive position changer 46 and a pressure-responsive lift reducer 47 are also included in PCV valve 10 as suggested diagrammatically in FIG. 1B and cooperate to define flow restrictor locator means 11. One function of flow restrictor locator means 46, 47 is to position flow restrictor 40 in a predetermined position in flow-metering orifice 39 relative to stationary partition wall 38 for a given temperature and pressure "profile" to establish the flow rate of metered fumes 28 discharged from PCV valve 10.

Flow restrictor 40 is linked to temperature-responsive position changer 46 by pressure-responsive lift reducer 47. Thus, the position of flow restrictor 40 in flow-metering orifice 39 formed in stationary partition wall 38, and thus the flow rate of metered fumes 28 discharged by PCV valve 10, is a function of a "temperature" input and a "differential pressure" input, which inputs cooperate to define the temperature and pressure profile inside shell 31.

As suggested in FIG. 1B, temperature-responsive position changer 46 comprises a movable shuttle 50 mounted for reciprocating movement in interior region 36 of shell 31, a temperature-activated shuttle lifter 51, and a shuttle sinker (i.e., over-ride spring) 52. Temperature-activated shuttle lifter 51 and shuttle sinker 52 cooperate to move shuttle 50 up and down in shell 31, depending upon temperature of crankcase fumes 27 in interior region 36 of shell 31. Flow restrictor 40 moves up and down in "stationary" flow-metering orifice 39 when shuttle 50 moves based on the temperature of crankcase fumes 27 applied to temperature-activated shuttle lifter 51 to change the effective size of flow-metering channel 45 so as to change the flow of metered fumes 28 discharged from PCV valve 10 to engine intake manifold 16. This influences the position of flow restrictor 40 in flow-metering orifice 39 formed in stationary partition wall 38 to account for temperature in PCV valve 10.

At the same time, pressure-responsive lift reducer 47 operates to move (and/or allow movement of) flow restrictor 40 relative to movable shuttle 50 based on the differential pressure applied to the top and bottom of flow restrictor 40. This also influences the position of flow restrictor 40 in flow-metering orifice 39 formed in stationary partition wall 38 to account for pressures in PCV valve 10.

Figure 2:
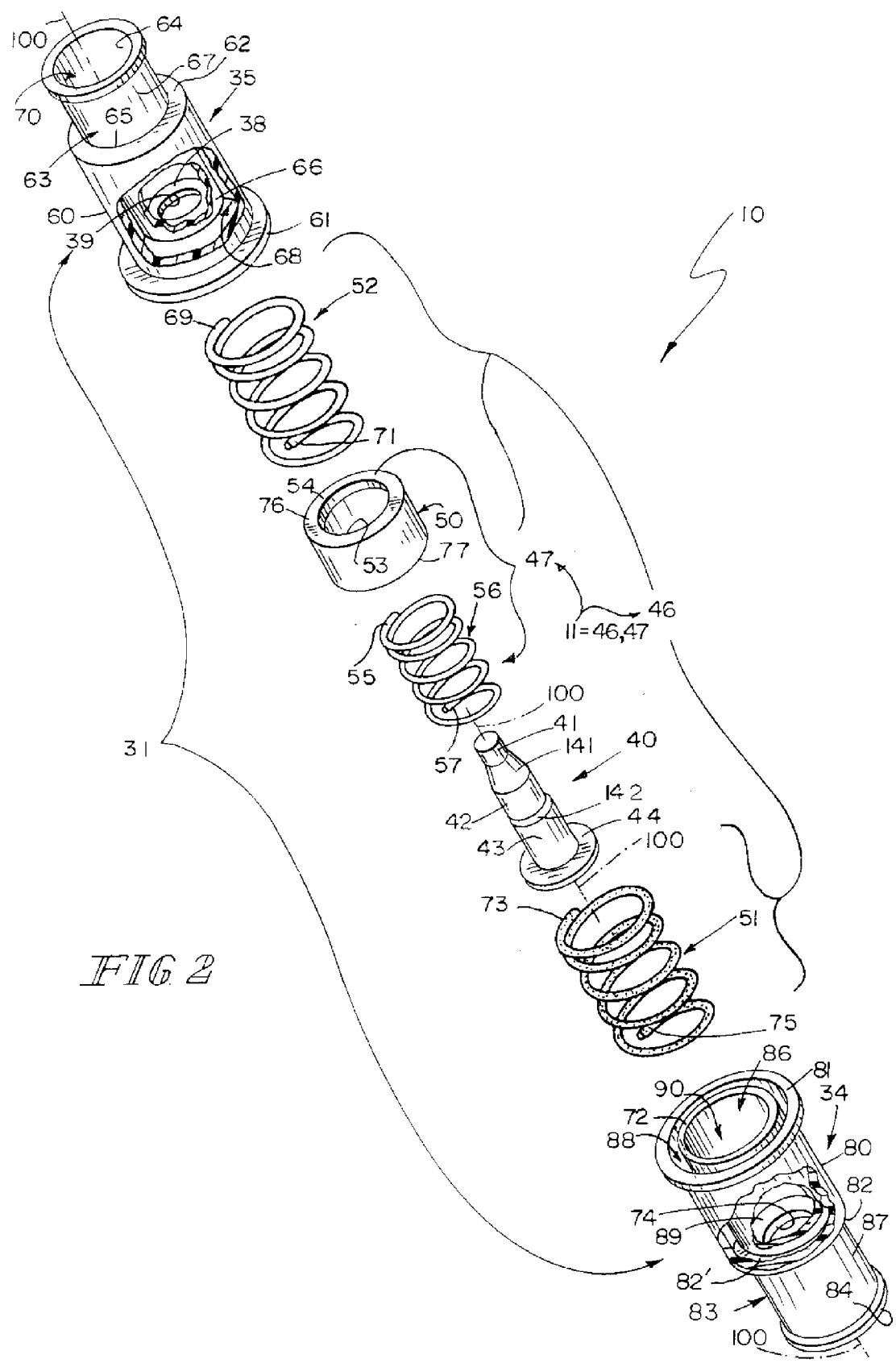
FIG. 2 is an exploded perspective view of components included in an illustrative embodiment of a PCV valve in accordance with the present disclosure showing in sequence (from top to bottom) an upper valve housing formed to include an interior region and a top outlet opening into the interior region and a stationary partition wall formed to include a flow-metering orifice and fixed in an interior region of the upper valve housing, a coiled shuttle sinker, a movable shuttle carrying a spring mount formed to include a restrictor-receiving orifice, a restrictor mover spring that cooperates with the spring mount to provide a pressure-responsive lift reducer, a flow restrictor sized to move up and down in the "small-diameter" flow-metering orifice and the "large-diameter" restrictor-receiving orifice, and a coiled shuttle lifter that is made of a temperature-activated shape-memory alloy and cooperates with the movable shuttle and shuttle sinker to provide a temperature-responsive position changer, and a lower valve housing that is configured to mate with the upper valve housing to define the PCV valve housing and includes an annular pit sized to receive a lower portion of the coiled shuttle lifter.

Illustrative components that may be assembled to produce PCV valve 10 are shown in FIG. 2. PCV valve 10 includes, for example, a shell (PCV valve housing) 31 comprising upper valve housing 35 and lower valve housing 34, a stationary partition wall 38 located in upper valve housing 35, flow restrictor 40, a temperature-responsive position changer 46 comprising shuttle sinker 52, shuttle 50, and temperature-activated shuttle lifter 51, and a pressure-responsive lift reducer 47 comprising a spring mount 54 carried on movable shuttle 50 and a restrictor mover spring 56 arranged to be interposed between spring mount 54 on movable shuttle 50 and base 44 of flow restrictor 40. Stationary partition wall 38 is formed to include a flow-metering orifice 39 and flow restrictor 40 moves up and down in orifice 39 (as suggested in FIGS. 3-6) to change the flow rate of crankcase fumes 27 passing through PCV valve 10 to control flow of metered fumes 28 to engine intake manifold 16. Temperature-responsive position changer 46 and pressure-responsive lift reducer 47 cooperate to define flow restrictor locator means 11 for locating flow restrictor 40 in (stationary) flow-metering orifice 39 in different positions in accordance with predetermined temperature and pressure conditions inside PCV valve 10.

Figure 3:
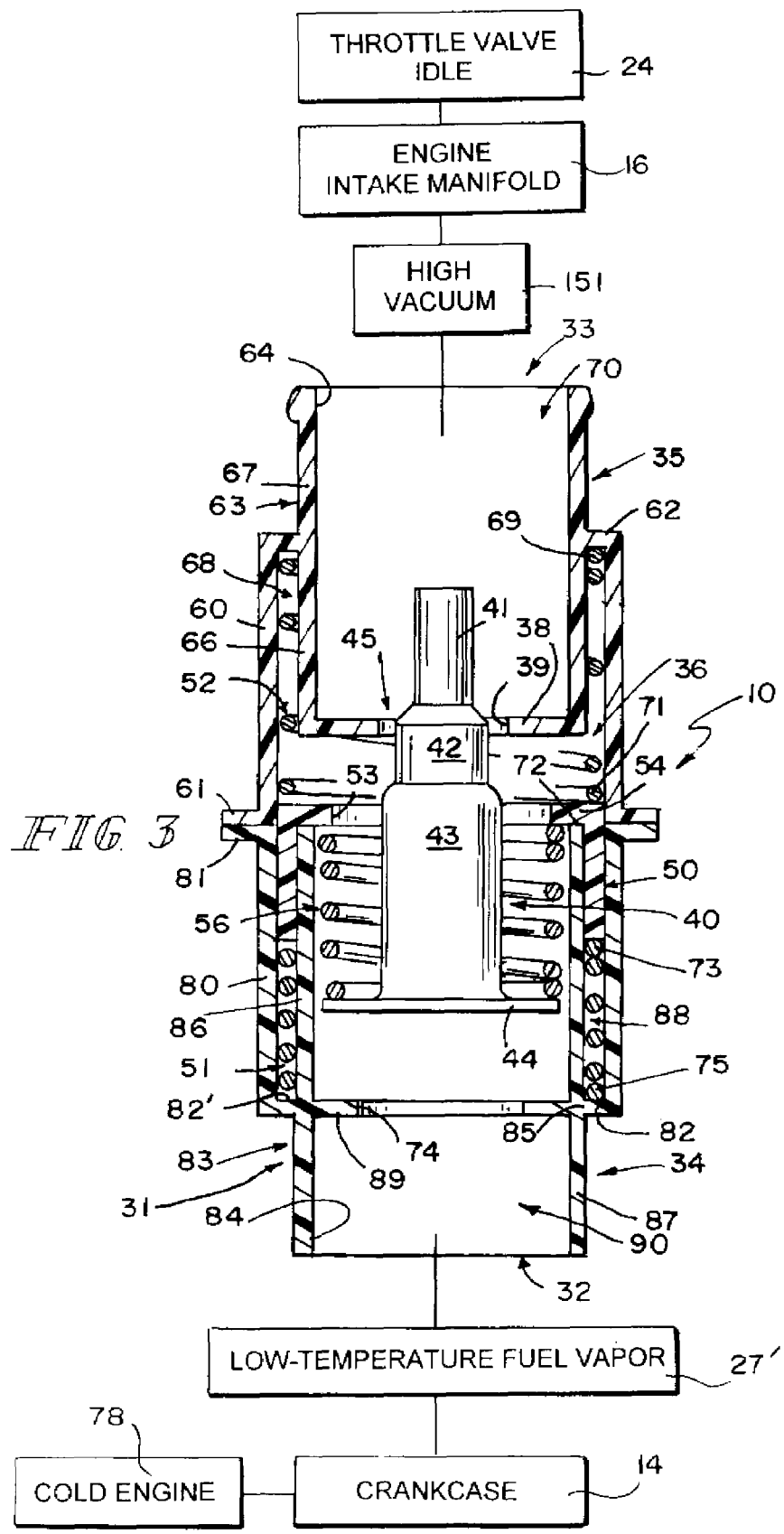
FIGS. 3-6 illustrate cooperative movement of the shuttle lifter and shuttle sinker in the PCV valve housing to raise the shuttle (and thus re-position the flow restrictor associated with the shuttle) toward the stationary partition wall to a raised "hot-engine" position whenever the engine (whether the throttle is idling or wide open) is hot and to lower the shuttle (and thus re-position the flow restrictor associated with the shuttle) away from the stationary partition wall to a lowered "cold-engine" position whenever the engine is cold.

As suggested in FIGS. 2 and 3, upper valve housing 35 includes an outer sleeve 60, a radially outwardly extending mount flange 61 at one end of outer sleeve 60, and a radially inwardly extending ceiling 62 at another end of outer sleeve 60. Upper valve housing 35 also includes an outlet tube 63 terminating at outlet opening 64. Outlet tube 63 extends through a central aperture 65 formed in ceiling 62 and provides an inner sleeve 66 extending between stationary partition wall 38 and ceiling 62 and an outlet sleeve 67 extending between ceiling 62 and outlet opening 64. Outer sleeve 60 is arranged to surround inner sleeve 66 and cooperate with ceiling 62 to form a sinker chamber 68 configured to receive an upper portion 69 of shuttle sinker 52 therein as shown, for example, in FIG. 3. Partition wall 38 and inner and outlet sleeves 66, 67 cooperate to define an outlet chamber 70 for receiving metered fumes 28 discharged through variable flow-metering channel 45. In the illustrative embodiment, upper valve housing 35 is a monolithic element made of plastics material.

As suggested in FIGS. 2 and 3, lower valve housing 34 includes an outer sleeve 80, a radially outwardly extending mount flange 81 at one end of outer sleeve 80, and a radially inwardly extending flange 82 at another end of outer sleeve 80. Lower valve housing 34 also includes a tube 83 terminating at inlet opening 84. Tube 83 "extends" through a central aperture 85 formed in flange 82 as suggested in FIG. 3 and provides an inner sleeve 86 extending upwardly from flange 82 toward upper valve housing 35 and terminating at annular shuttle stop 72. Tube 83 also provides an inlet sleeve 87 extending between flange 82 and inlet opening 84. Outer sleeve 80 is arranged to surround inner sleeve 86 and cooperate with flange 82 to form an annular lifter pit 88 configured to receive shuttle lifter 51 and a portion of shuttle 50 therein and to terminate at an annular pit floor 82' defined by an upwardly facing surface included in radially inwardly extending flange 82 as shown, for example, in FIG. 3. Tube 83 is configured to define an inlet chamber 90 for receiving crankcase fumes 27 discharged from engine crankcase 14. An annular platform 89 extends radially inwardly from an interior surface of tube 83 into inlet chamber 90 and terminates at an annular border defining an aperture 74. In the illustrated embodiment, lower valve housing 34 is a monolithic element made of a plastics material and platform 89 is an "extension" of flange 82 as suggested in FIG. 3.

Movable shuttle 50 is a cylinder-shaped element formed to include an annular upper end 76 arranged to abut a lower end 71 of shuttle sinker 52 and an annular lower end 77 arranged to abut an upper end 73 of shuttle lifter 51 as suggested in FIGS. 2 and 3. Movable shuttle 50 is arranged to extend downwardly into annular lifter pit 88 and is interposed between temperature-activated shuttle lifter 51 and shuttle sinker 52. Annular spring mount 54 is appended to annular upper end 76 of movable shuttle 50 and arranged to extend in a radially inward direction to lie and move in a space between stationary partition wall 38 and annular shuttle stop 72. Thus, movable shuttle 50 is mounted for up-and-down movement in a shuttle space provided in shell 31 between a lowered "cold-engine" position engaging annular shuttle stop 72 as shown, for example, in FIGS. 3 and 5 when a "cold engine" condition 78 exists and low-temperature fuel vapor 27' is discharged from engine crankcase 14 into inlet chamber 90 and a raised "hot-engine" position engaging stationary partition wall 38 as shown, for example, in FIGS. 4 and 6 when a "hot engine" condition 79 exists and high-temperature fuel vapor 27" is discharged from engine crankcase 14 into inlet chamber 90.

Shuttle lifter 51 is a temperature-activated memory element made of, for example, a shape-memory alloy such as a nickel-titanium (nitinol) alloy. Shuttle lifter 51 is originally annealed to an austenitic state to assume a preset lengthened coiled shape as shown, for example, in FIGS. 4 and 6. Shuttle lifter 51 is then cooled to a martensitic state and compressed to assume a shortened coiled shape as shown, for example, in FIGS. 3 and 5. Shuttle lifter 51 is placed into annular lifter pit 88 formed in lower valve housing 34 while in its cooled martensitic state and moved to cause a lower end 75 of shuttle lifter 51 to rest against annular pit floor 82' as shown, for example, in FIG. 3. Whenever shuttle lifter 51 is heated thereafter to a predetermined transitional temperature specified for the shape-memory alloy used to make shuttle lifter 51 (as by exposure to high-temperature crankcase fumes 27"), shuttle lifter 51 then will move (e.g., expand or lengthen) in annular lifter pit 88 to assume its pre-set lengthened coiled shape as suggested in FIGS. 4 and 6.

Shuttle sinker 52 is a coiled compression spring located in sinker chamber 68 provided in upper valve housing 35. An upper portion 69 of shuttle sinker 52 abuts an underside of ceiling 62 while a lower portion 71 of shuttle sinker 52 abuts annular upper end 76 of movable shuttle 50. Shuttle sinker 52 has a spring constant selected to apply a downward force to urge movable shuttle 50 to move downwardly in shell 31 to compress shuttle lifter 51 to cause shuttle lifter 51 to move to assume its cooled martensitic state as shown, for example, in FIGS. 3 and 5. However, whenever shuttle lifter 51 is heated to its predetermined transitional temperature, then shuttle lifter 51 will move to assume its preset lengthened coiled shape as shown, for example, in FIGS. 4 and 6 and move shuttle 50 upwardly to compress coiled shuttle sinker 52 located in upper valve housing 35.

Pressure-responsive lift reducer 47 provides means for moving (or allowing movement of) flow restrictor 40 in flow-metering orifice 39 formed in stationary partition wall 38 in response to changing flow rate of fumes 27 through PCV valve 10. In the illustrated embodiment, lift reducer 47 includes spring mount 54 coupled to movable shuttle 50 to move therewith and a coiled restrictor mover spring 56 as shown in FIG. 2. Spring mount 54 is coupled to annular upper end 76 of movable shuttle 50 for up-and-down movement with shuttle 50. Restrictor mover spring 56 is a coiled compression spring having an upper end 55 arranged to engage an underside of spring mount 54 and a lower end 57 arranged to engage base 44 provided on flow restrictor 40 normally to urge flow restrictor 40 in a downward direction toward inlet opening 84. Restrictor mover spring 56 is arranged to wind around flow restrictor 40 and lie in an interior region defined by cylindrical shuttle 50 as shown in FIG. 3.

Flow restrictor 40 is arranged to "float" freely in an interior region 36 of shell 31 in that it is not permanently connected to restrictor mover spring 56. The position of flow restrictor 40 in shell 31 is a function of the vacuum applied by engine intake manifold 16 to outlet chamber 70. In other words, a pressure difference above and below flow restrictor 40 created by flow of fumes into engine intake manifold 16 causes flow restrictor 40 to float in interior region 36 of shell 31 and move up and down somewhat in flow-metering orifice 39 formed in stationary partition wall 38.

Upper valve housing 35 includes a mount flange 61 sized and located to mate with a mount flange 81 in lower valve housing 34 (using any suitable method) to form shell 31. Once mated, upper and lower valve housings 35, 34 cooperate to form an interior region containing flow restrictor 40, temperature-responsive position changer 46 comprising movable shuttle 50, temperature-activated shuttle lifter 51, and shuttle sinker 52, and pressure-responsive lift reducer 47 comprising spring mount 54 and restrictor mover spring 56.

Flow restrictor 40 includes a plurality of differently sized control portions which are positionable in orifice 39 to vary flow through flow-metering channel 45, depending upon which control portion is positioned in orifice 39 as shown, for example, in FIGS. 3-6. Illustratively, flow restrictor 40 includes first, second, and third cylindrical control portions 41, 42, 43 and first and second transition control portions 141, 142 which have a generally frustoconical shape as shown in FIG. 2. Control portions 44, 141, 42, 142, 43 are aligned along axis 100. First transition control portion 141 interconnects first and second cylindrical control portions 41, 42. Second transition control portion 142 interconnects second and third cylindrical control portions 42, 43. First cylindrical control portion 41 has a first diameter. Second cylindrical control portion 42 has a second diameter larger than the first diameter. Third cylindrical control portion 43 has a third diameter larger than the second diameter. First transition control portion 141 has a fourth diameter which increases as control portion 141 extends axially from first cylindrical control portion 41 to second cylindrical control portion 42. Second transition control portion 143 has a fifth diameter which increases as control portion 143 extends axially from second cylindrical control portion 42 to third cylindrical control portion 43.

In illustrative embodiments, flow restrictor locator means 11 includes a temperature-responsive position changer 46 comprising a movable shuttle 50, a temperature-activated shuttle lifter 51 acting against a bottom side of movable shuttle 50, and a shuttle sinker 52 acting against a top side of movable shuttle 50. Movable shuttle 50 is associated with flow restrictor 40 and is constrained to move up and down in a shuttle space defined in the interior region 36 of shell 31. Flow restrictor 40 is linked to shuttle 50 so that "sinking" (i.e., lowering) movable shuttle 50 in the shuttle space provided in shell 31 causes flow restrictor 40 to move downwardly in flow-metering orifice 39 to vary the flow rate of metered fumes 48 discharged from PCV valve 10 to engine intake manifold 16 coupled to PCV valve 10. In contrast, owing to the link between flow restrictor 40 and movable shuttle 50, "lifting" (i.e., raising) shuttle 50 in the shuttle space provided in shell 31 allows flow restrictor 40 to move upwardly in flow-metering orifice 39 formed in stationary partition wall 38 again to vary the flow rate of metered fumes 28 discharged from PCV valve 10 to engine intake manifold 16.

Flow restrictor 40 is arranged to extend through a restrictor-receiving orifice 53 formed in movable shuttle 50 and through flow-metering orifice 39 formed in stationary partition wall 38. In the illustrated embodiment, the inner diameter of restrictor-receiving orifice 53 is larger than the inner diameter of flow-metering orifice 39. Flow restrictor 40 moves up and down in that restrictor-receiving orifice 53 relative to movable shuttle 50 (and also moves up and down in flow-metering orifice 39) in response to a change in the flow rate of crankcase fumes 27 flowing through shell 31.

Temperature-activated shuttle lifter 51 is a temperature-activated memory element made of a shape-memory alloy such as nitinol. Shuttle lifter 51 is arranged to lift shuttle 50 to a raised hot-engine position in the shuttle space of shell 31 to allow flow restrictor 40 to move upwardly when the crankcase fumes 27 are relatively hot and during a hot-engine condition 79 and the shape-memory alloy is heated to change from a martensitic (cold) state to an austenitic (hot) state. Shuttle lifter 51 is configured to lie in a coil and is arranged to wind around and in spaced-apart relation to a portion of flow restrictor 40 as suggested, for example, in FIGS. 2 and 3.

Shuttle sinker 52 is an over-ride spring made of a yieldable spring material. Shuttle sinker 52 is arranged to move shuttle 50 downwardly against shuttle lifter 51 to a lowered position in the shuttle space of shell 31 to "over-ride" an upward force generated by shuttle lifter 51 when crankcase fumes 27 are relatively cold during a cold-engine condition 78 and the shape-memory alloy in shuttle lifter 51 has cooled and returned to the martensitic (cold) state.

Flow restrictor locator means 11 also includes a pressure-responsive lift reducer 47 that is linked to movable shuttle 50 and configured to react to the engine throttle valve position to move flow restrictor 40 downwardly in flow-metering orifice 39 in response to changing differential pressure conditions between engine intake manifold 16 and engine crankcase 14 that are manifested in interior region 36 of shell 31. In illustrative embodiments, pressure-responsive lift reducer 47 comprises a spring mount 54 coupled to movable shuttle 50 to move therewith and a restrictor mover spring 56 located inside movable shuttle 50 and interposed between spring mount 54 and a base 44 on flow restrictor 40. Shuttle sinker 52, movable shuttle 50, and pressure-responsive lift reducer 47 cooperate to provide link means for linking the temperature-activated shuttle lifter 51 to flow restrictor 40 to cause flow restrictor 40 to move in flow-metering orifice 39 and relative to shuttle lifter 51 to change the effective size of variable flow-metering channel 45 in response to expansion of the heated temperature-activated shuttle lifter 51. As shown, for example, in FIG. 3, both of temperature-activated shuttle lifter 51 and link means 47, 50, 52 are located in inlet chamber 90 formed in valve housing 31.

Restrictor mover spring 56 is made of a yieldable spring material and is arranged to act against spring mount 54 coupled to movable shuttle 50 to urge flow restrictor 40 downwardly relative to spring mount 54 and movable shuttle 50 when crankcase fumes 27 admitted into shell 31 travel through shell 31 at a "relatively low" flow rate when, for example, the engine throttle valve 24 is "wide open" and a low vacuum 149 is applied by the engine intake manifold 16 to outlet 64 of upper valve housing 35. When the engine throttle valve 24 is "at idle" and a high vacuum 151 is applied by engine intake manifold 16 to outlet 64 of upper valve housing 35, the flow rate of crankcase fumes 27 through shell 31 increase to a "relatively high" flow rate and the floating flow restrictor 40 moves upwardly in flow-metering orifice 39 to overcome a downward biasing force applied by restrictor mover spring 56 (so as to compress restrictor mover spring 56) and moves to higher elevation in shell 31.

In operation, flow restrictor 40 floats and moves to assume various predetermined positions in stationary flow-metering orifice 39 to control flow of metered fumes 28 discharged by PCV valve 10 to engine intake manifold 16 as a function of the temperature and pressure of the crankcase fumes 27 extant in shell 31. To account for temperature, temperature-activated shuttle lifter 51 and shuttle sinker 52 cooperate to move shuttle 50 to a predetermined position in the shuttle space provided in shell 31. Flow restrictor 40 moves with shuttle 50 owing to the link between flow restrictor 40 and shuttle 50. At the same time, to account for pressure, pressure-activated lift reducer 47 varies the position of flow restrictor 40 relative to the already positioned shuttle 50 so that flow restrictor 40 has been moved (or allowed to move) to assume a predetermined position in stationary flow-metering orifice 39. Thus, movable shuttle 50, temperature-activated shuttle lifter 51, shuttle sinker 52, and pressure-activated lift reducer 47 cooperate to relocate flow restrictor 40 in flow-metering orifice 39 in different positions as a function of (1) pressure established by engine throttle valve position (e.g., idle or wide open) and (2) crankcase fume temperature (e.g., cold at cold-engine start and hot during hot-running operation).

As shown in FIG. 3, PCV valve 10 is placed in a low-temperature idle condition during cold engine condition 78 and high vacuum condition 151. Shuttle lifter 51 is in its shortened martensitic state and the spring force generated by shuttle sinker 52 urges shuttle 50 in a downward direction. Engine throttle valve 24 is partly closed at idle, fuel/air mixture requirement is minimal, blow-by gas 27 production is low, and vacuum in engine intake manifold 16 is high, creating high flow into engine intake manifold 16. Flow restrictor 40 is "sucked up" into outlet chamber 70, reducing the effective size of variable flow-metering channel 45 and, as a result, reducing flow through PCV valve 10. What keeps flow restrictor 40 from falling down toward platform wall 89 during engine operation is the pressure difference created by flow through PCV valve 10 into engine intake manifold 16. At high flow rates, the pressure acting on the bottom side of flow restrictor 40 is higher than pressure acting on the top side of flow restrictor 40, thereby lifting and floating flow restrictor 40 and pushing it against restrictor mover spring 56. In this operating condition, flow restrictor 40 is designed to "operate" on intermediate-diameter, second-stage control portion 42. Base 44 of flow restrictor 40 and platform 89 of valve housing 31 cooperate to define an empty space therebetween in response to upward movement of flow restrictor 40 to the high vacuum position as shown in FIG. 3 and also in FIG. 4.

Figure 4:
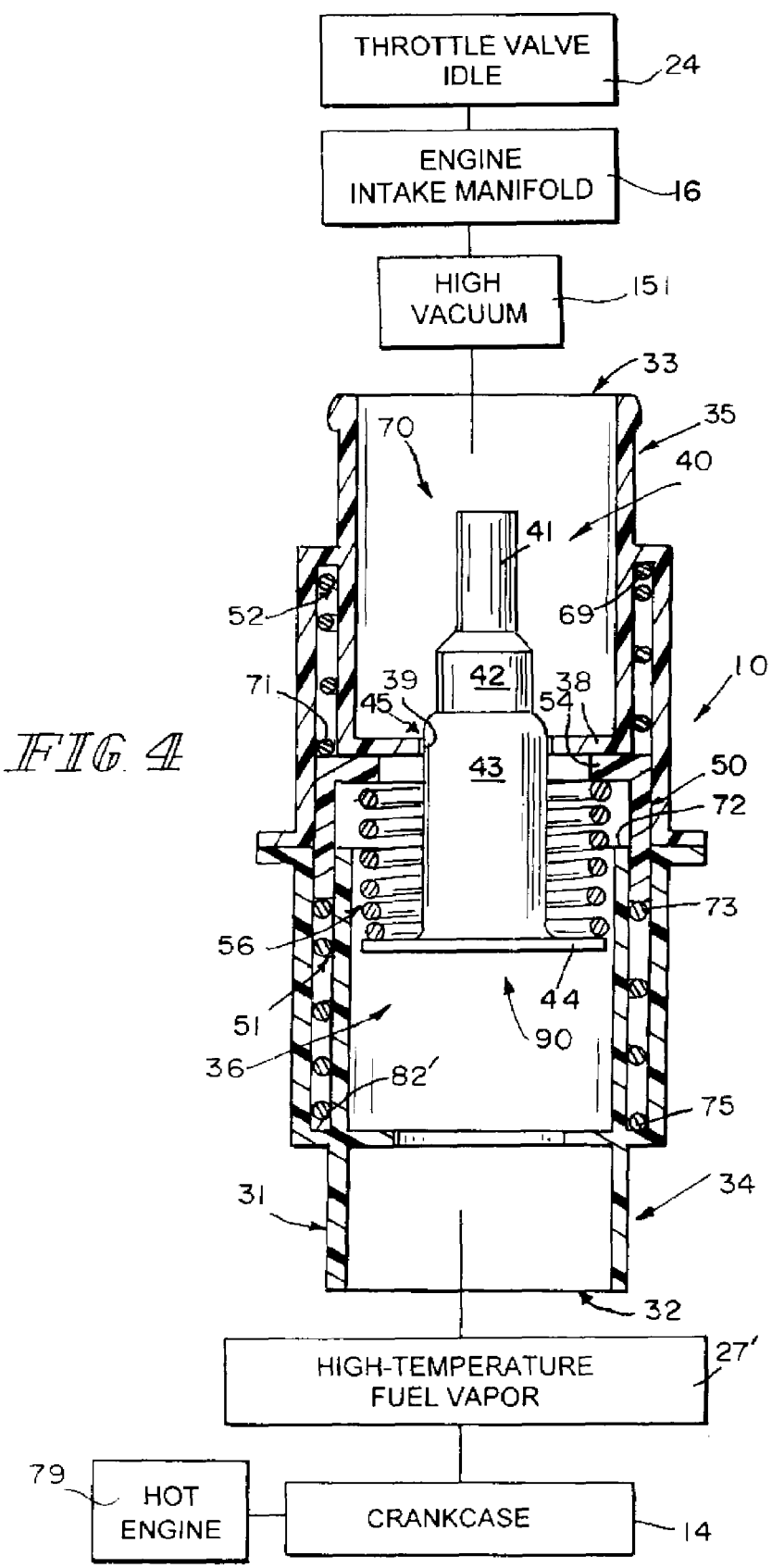

As shown in FIG. 4, PCV valve 10 is placed in a hot-temperature idle condition during hot engine condition 79 and high vacuum condition 151. At these hot engine temperatures 79, the shape-memory alloy defining temperature-activated shuttle lifter 51 changes to its austenitic state and moves to assume the preset lengthened coiled shape. This movement pushes shuttle 50 up in shell 31 and compresses shuttle sinker 52. In this operating condition, the "stop point" for restrictor mover spring 56 has changed, allowing flow restrictor 40 to travel farther up in stationary flow-metering orifice 39, further reducing the effective size of flow-metering channel 45 and reducing flow of metered fumes 28 to engine intake manifold 16. In this operating condition, flow restrictor 40 is designed to "operate" on large-diameter, third-stage control portion 43.

Figure 5:
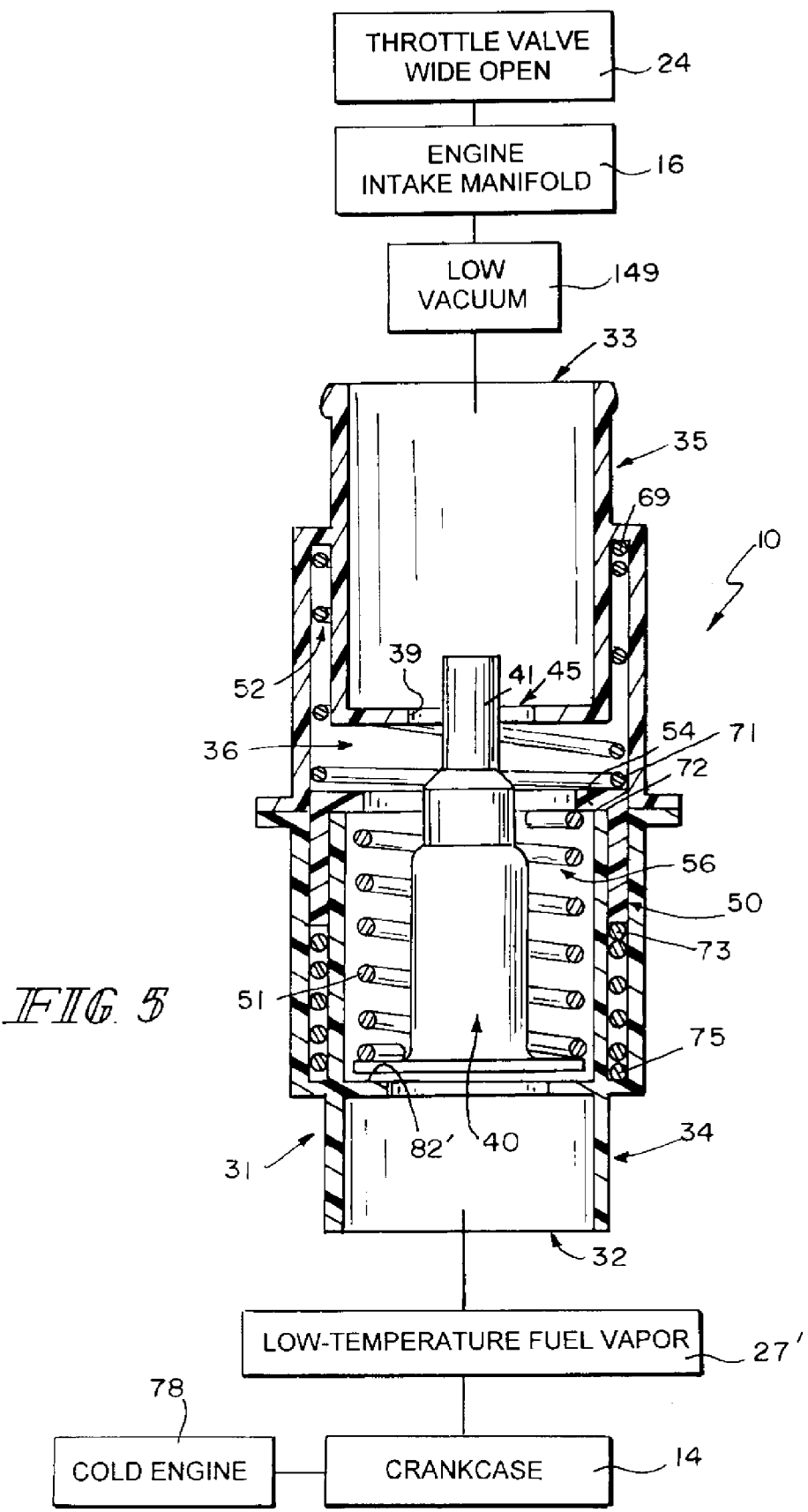

As shown in FIG. 5, PCV valve 10 is placed in a low-temperature, wide-open throttle condition during cold engine condition 78 and low vacuum condition 149. The need for fuel/air mixture is greater, blow-by fume 27 production is high, and the vacuum in the engine intake manifold 16 is low, which creates low flow into manifold 16. When this happens, flow restrictor 40 operates on small-diameter, first-stage control portion 41 in stationary flow-metering orifice 39 to increase the effective size of flow-metering channel 45 and flow of metered fumes 28 to engine intake manifold 16. At low flow rates, the pressure in inlet chamber 90 acting on the bottom side of flow restrictor 40 cannot lift flow restrictor 40 high enough to operate on intermediate-diameter, second-stage control portion 42.

Figure 6:
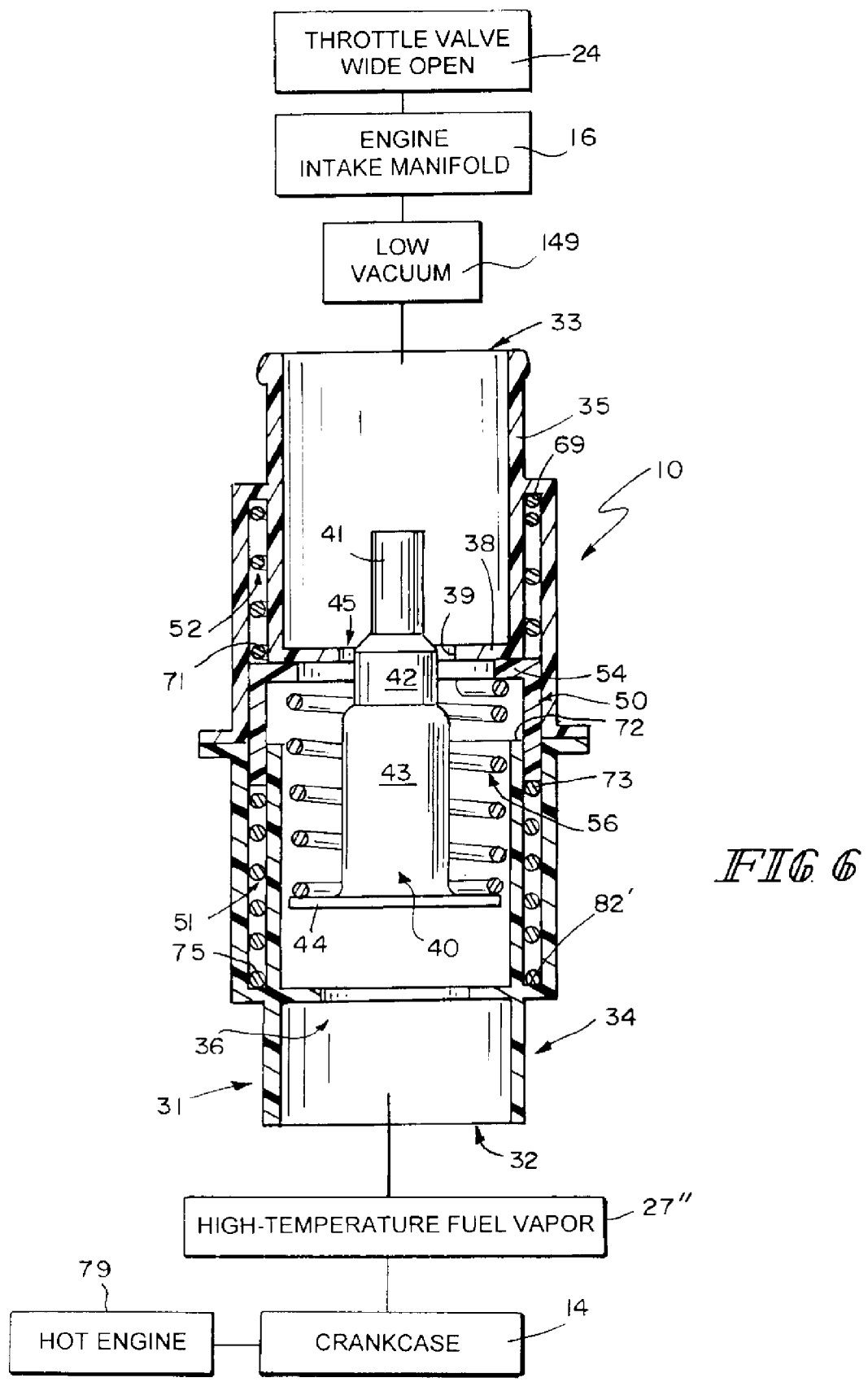

As shown in FIG. 6, PCV valve 10 is placed in a high-temperature, wide-open throttle condition during hot engine condition 79 and low vacuum condition 149. Now hot-engine temperature 79 causes the shape-memory alloy defining temperature-activated shuttle lifter 51 to change to its austenitic state and move to assume the present lengthened coiled shape. This movement pushes movable shuttle 50 in an upward direction in shell 31 and compresses shuttle sinker 52. In this operating condition, the "stop point" for restrictor mover spring 56 has changed, allowing flow restrictor 40 to travel farther up in stationary flow-metering orifice 39 further reducing the effective size of flow-metering channel 45 and reducing flow of metered fumes 28 to engine intake manifold 16. In this operating condition, flow restrictor 140 is designed to "operate" on intermediate-diameter, second-stage control portion 42.

Figure 7:
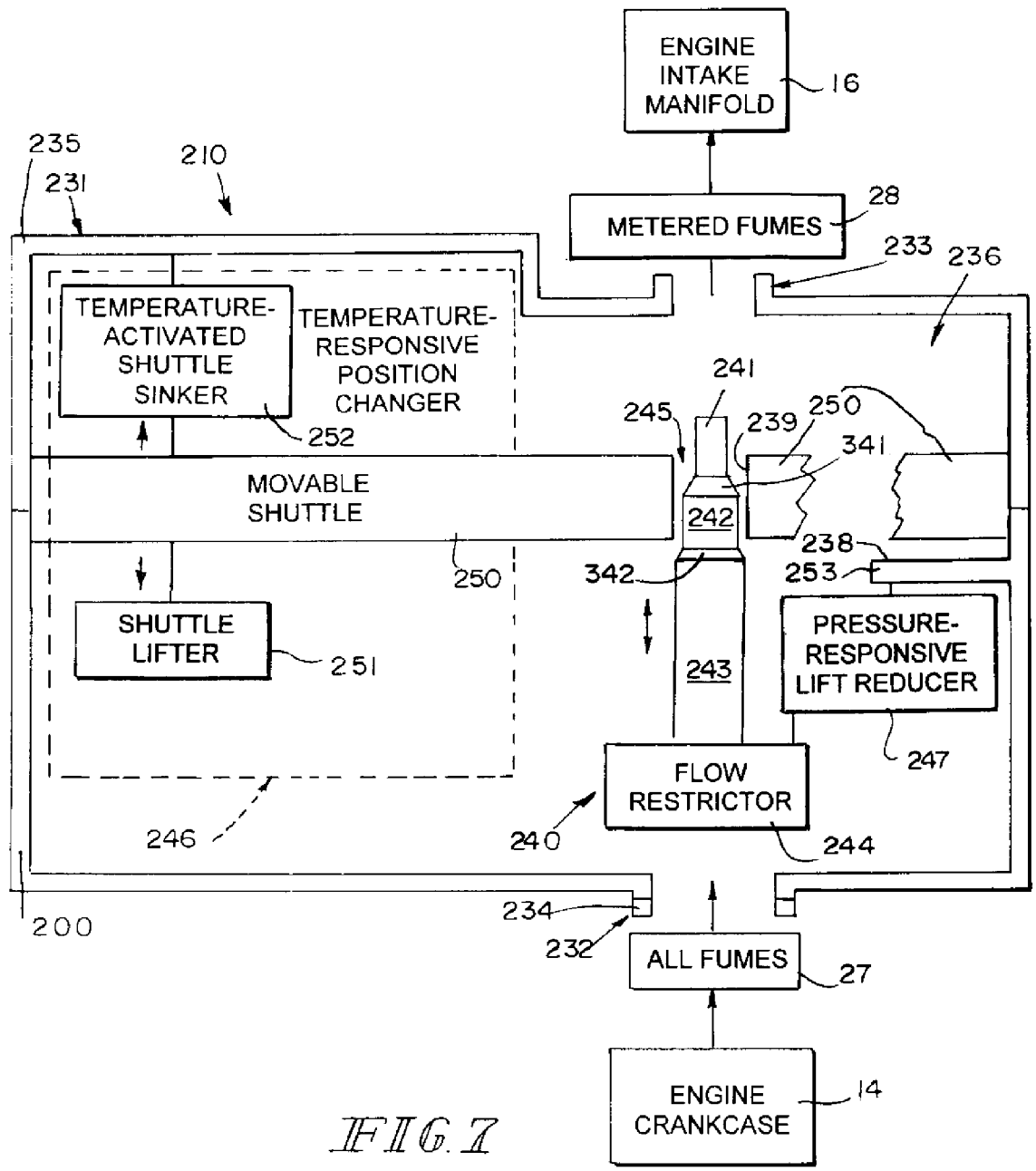
FIG. 7 is a schematic view of components included in the PCV valve showing a "three-stage" flow restrictor mounted for movement in a PCV valve housing to regulate flow of crankcase fumes through a "movable" flow-metering orifice formed in a movable shuttle mounted for movement in the PCV valve housing and showing a temperature-responsive (flow restrictor) position changer comprising the shuttle, a shuttle lifter, and a temperature-activated shuttle sinker, and also showing a pressure-responsive (flow restrictor) lift reducer linking the flow restrictor to an interior wall included in the PCV valve housing and suggesting that the position changer and lift reducer cooperate to move the flow restrictor in the flow-metering orifice formed in the movable shuttle to locate either a small-diameter first stage, an intermediate-diameter second stage, or a large-diameter third stage in the flow-metering orifice as a function of temperature and pressures extant in the PCV valve housing.

In the block diagram illustrated in FIG. 7, a PCV valve 210 in accordance with a second embodiment of the disclosure includes a shell or valve housing 231 formed to include an inlet 232 coupled to engine crankcase 14 to receive crankcase fumes 27 and an outlet 233 for discharging metered fumes 28 to engine intake manifold 16. Illustratively, shell 231 comprises a lower valve housing 234 including inlet 232, an upper valve housing 235 including outlet 233, and a middle valve housing 200 interposed between the lower and upper valve housings 234, 235 as suggested diagrammatically in FIG. 7 and in an illustrative embodiment in FIGS. 8 and 9.

PCV valve 210 also includes a flow restrictor 240 (e.g., pintle) located in an interior region 236 of shell 231 and mounted for movement in a flow-metering orifice 239 formed in a movable shuttle 250 that is also mounted for movement in interior region 236 of shell 231. Movable shuttle 250 is arranged to partition interior region 236 of shell 231 to provide a movable boundary between an underlying inlet chamber 290 communicating with inlet 232 and an overlying outlet chamber 270 communicating with outlet 233 as suggested, for example, in FIGS. 9-12. Flow-metering orifice 239 provides a fluid-conducting passageway between inlet and outlet chambers 290, 270.

Flow restrictor 240 includes a small-diameter, first-stage control portion 241, an intermediate-diameter, second-stage control portion 242, a large-diameter, third-stage control portion 243, and a base 244 as suggested in FIG. 7. The flow rate of crankcase fumes 27 through flow-metering orifice 239 formed in movable shuttle 250 is established by the position of flow restrictor 240 in flow-metering orifice 239 relative to movable shuttle 250 as shown in FIGS. 9-12.

Movable shuttle 250 includes an interior border edge defining orifice 239 and providing a first flow-metering surface bordering orifice 239. Flow restrictor 240 extends into orifice 239 as suggested in FIG. 7 and control portions 241, 242, and 243 cooperate to provide a second flow-metering surface (on the exterior of flow restrictor 240). That second flow-metering surface cooperates with the first flow-metering surface to define a variable flow-metering channel 245 therebetween. The effective size of flow-metering channel 245 is varied by up-and-down movement of flow restrictor 240 in orifice 239 owing, in part, to the varying cross-sectional dimensions of control portions 241, 242, and 243 of flow restrictor 240.

A temperature-responsive position changer 246 and a pressure-responsive lift reducer 247 are also included in PCV valve 210 as suggested diagrammatically in FIG. 7 and cooperate to define flow restrictor locator means 211. One function of flow restrictor locator means 211 is to position flow restrictor 240 in a predetermined position in flow-metering orifice 239 relative to movable shuttle 250 for a given temperature and pressure "profile" inside shell 231 to establish the flow rate of metered fumes 28 discharged from PCV valve 210.

Movable shuttle 250 is included in temperature-responsive position changer 246 and arranged to move in up-and-down directions in interior region of shell 231 as the temperature of crankcase fumes 27 passing through shell 231 changes so as to change the position of flow-metering orifice 239 formed in movable shuttle 250. Stationary wall or spring mount 238 is included in pressure-responsive lift reducer 247 and coupled to, for example, middle valve housing 200 of shell 231. Flow restrictor 240 is linked to spring mount 238 by a restrictor mover spring 256 included in pressure-responsive lift reducer 247. Thus, the position of flow restrictor 240 in flow-metering orifice 239 formed in movable shuttle 250 and thus the flow rate of metered fumes 28 discharged by PCV valve 210, is a function of a "temperature" input and a "differential pressure" input, which inputs cooperate to define the temperature and pressure profile inside shell 231.

As suggested in FIG. 7, temperature-responsive position changer 246 comprises movable shuttle 250, a shuttle lifter (i.e., over-ride spring) 251, and a temperature-activated shuttle sinker 252. Shuttle lifter 251 and temperature-activated shuttle sinker 252 cooperate to move shuttle 250 up and down in shell 231, depending upon temperature of crankcase fumes 27 in interior region 236 of shell 231. Flow restrictor 240 moves up and down in flow-metering orifice 239 when movable shuttle 250 moves relative to flow restrictor 240 based on temperature of crankcase fumes 27 applied to temperature-activated shuttle sinker 252 to change the effective size of flow-metering channel 245 so as to change the flow of metered fumes 28 discharged from PCV valve 210 to engine intake manifold 16. This influences the position of flow restrictor 240 in flow-metering orifice 239 formed in movable shuttle 250 to account for temperature in PCV valve 210.

At the same time, pressure-responsive lift reducer 247 operates to move (and/or allow movement of) flow restrictor 240 relative to shell 231 based on the differential pressure applied to the top and bottom of flow restrictor 240. This also influences the position of flow restrictor 240 in flow-metering orifice 239 formed in movable shuttle 250 to account for pressures in PCV valve 210.

Figure 8:
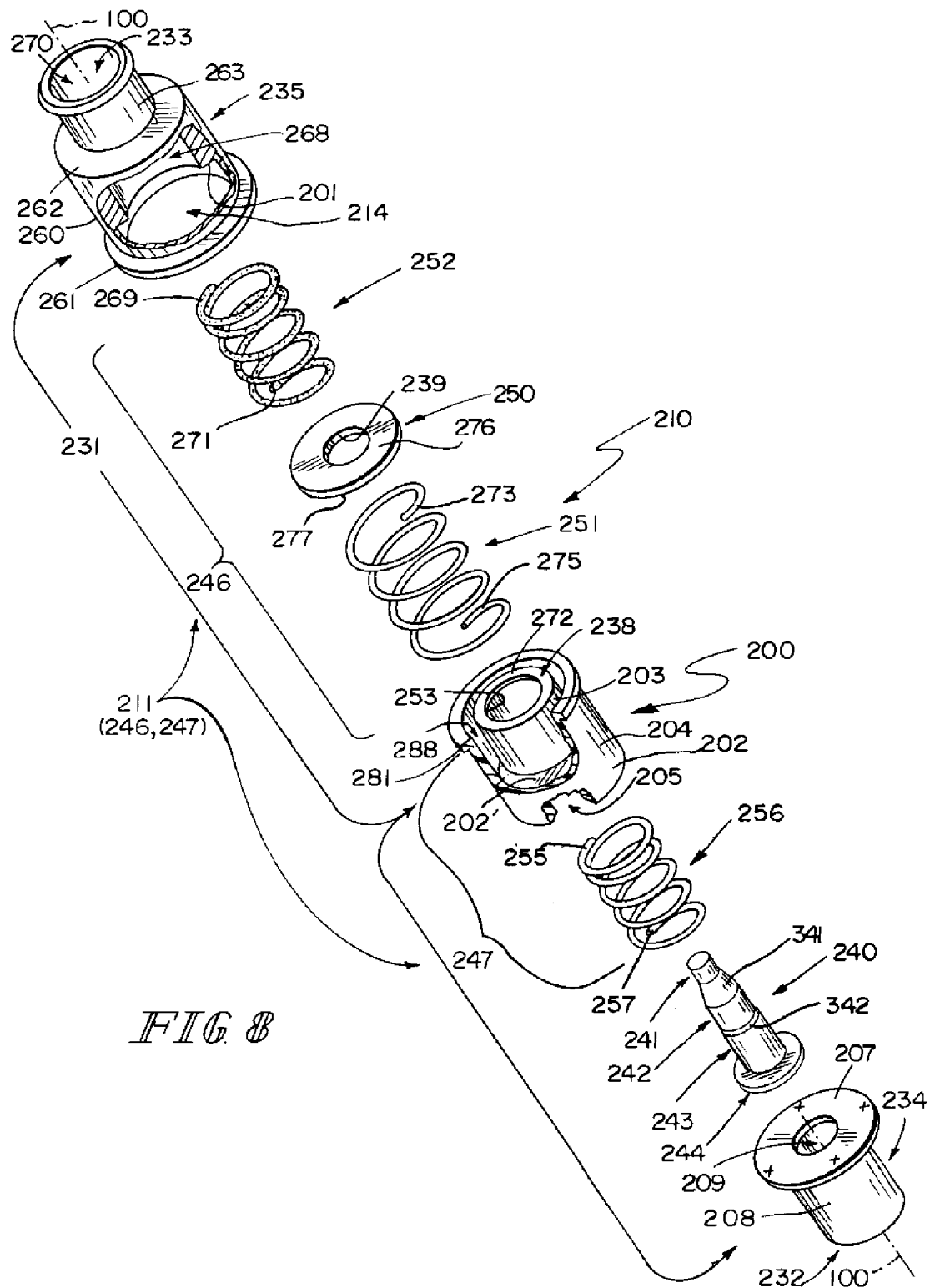
FIG. 8 is an exploded perspective view of components included in another illustrative embodiment of a PCV valve in accordance with the present disclosure showing in sequence (from top to bottom) an upper valve housing formed to include an interior region and a top outlet opening into the interior region, a coiled shuttle sinker that is made of a temperature-activated shape-memory alloy, a movable shuttle formed to include a flow-metering orifice, a coiled shuttle lifter that cooperates with the movable shuttle and shuttle sinker to provide a temperature-responsive position changer, a middle valve housing configured to underlie and mate with the upper valve housing and to include an annular lifter pit sized to receive a lower portion of the coiled shuttle lifter, a spring mount coupled to an inner sleeve of the middle valve housing, a restrictor mover spring that cooperates with the spring mount to provide a pressure-responsive lift reducer, a flow restrictor sized to move up and down in the "small-diameter" flow-metering orifice formed in the movable shuttle and a "larger-diameter" restrictor-receiving orifice formed in the spring mount, and a lower valve housing that is configured to mate with the middle valve housing and to cooperate with the middle and upper valve housings to define the PCV valve housing.

Illustrative components that may be assembled to producer PCV valve 210 are shown in FIG. 8. PCV valve 210 includes, for example, a shell (PCV valve housing) 231 comprising lower, middle, and upper valve housing 234, 200, 235, flow restrictor 240, a temperature-response position changer 246 comprising temperature-activated shuttle sinker 252, movable shuttle 250, and shuttle lifter 251, and a pressure-responsive lift reducer 247 comprising spring mount 238 coupled to middle valve housing 200 and a coiled restrictor mover spring 256 interposed between stationary spring mount 238 and base 244 of flow restrictor 240. Stationary wall or spring mount 238 is formed to include a restrictor-receiving orifice 253 and flow restrictor 240 is arranged to move up and down in restrictor-receiving orifice 253 as flow restrictor 240 moves up and down in flow-metering orifice 239 formed in movable shuttle 250 (as suggested in FIGS. 9-12) to change the flow rate of crankcase fumes 27 passing through PCV valve 210 to control flow of metered fumes 28 to engine intake manifold 16. Temperature-responsive position changer 246 and pressure-responsive lift reducer 247 cooperate to define flow restrictor locator means 211 for locating flow restrictor 240 in (movable) flow-metering orifice 239 in different positions in accordance with predetermined temperature and pressure conditions inside PCV valve 210.

Figure 9:
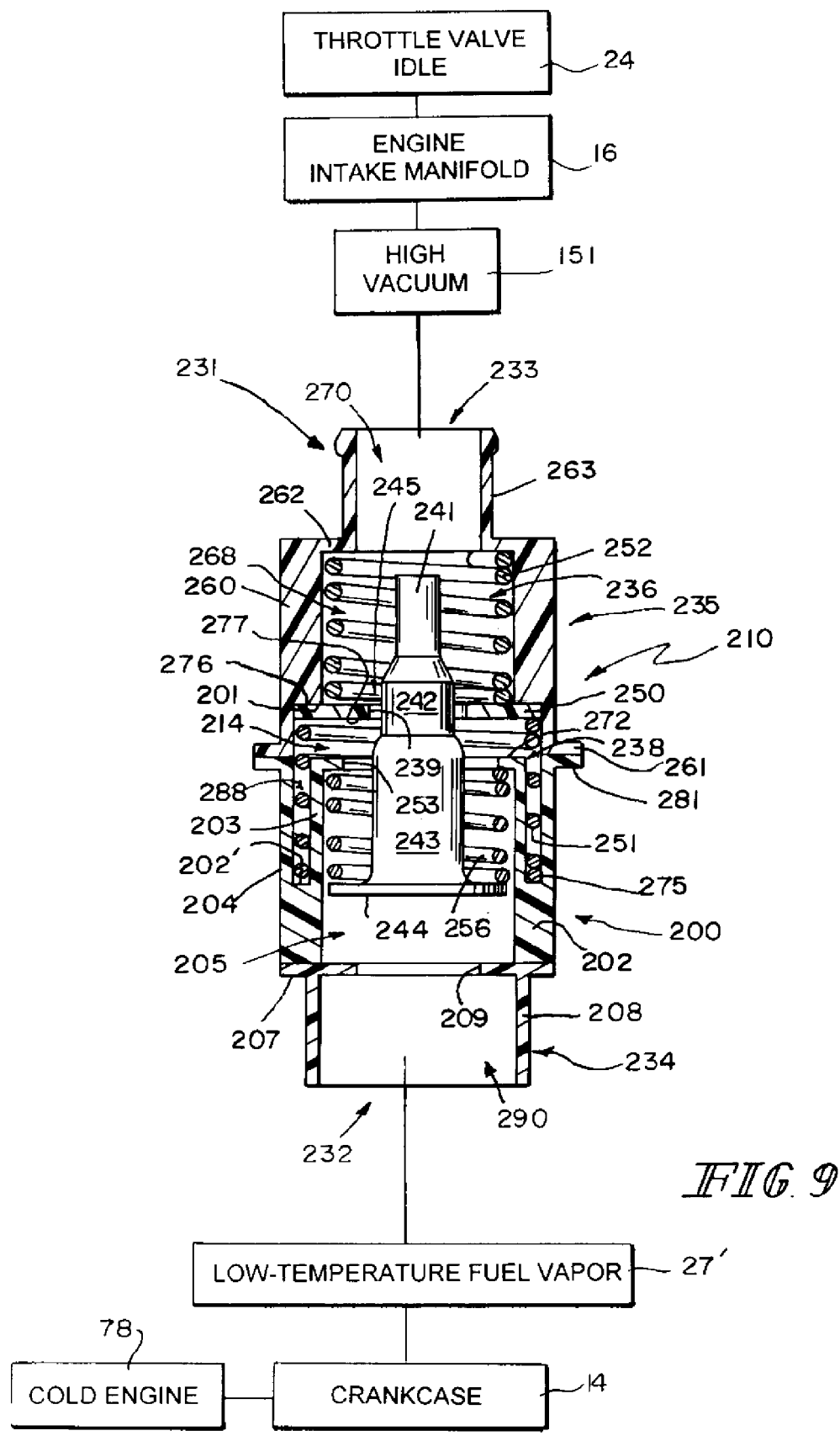
FIGS. 9-12 illustrate cooperative movement of the shuttle lifter and shuttle sinker in the PCV valve housing to raise the movable shuttle (and thus re-position the flow restrictor associated with the movable shuttle) toward the top outlet formed in the PCV valve housing to a raised "hot-engine" position whenever the engine (whether the throttle is idling or wide open) is hot and to lower the movable shuttle (and thus re-position the flow restrictor associated with the movable shuttle) away from the top outlet formed in the PCV valve housing to a lowered "cold-engine" position whenever the engine is cold.

As suggested in FIGS. 8 and 9, upper valve housing 235 includes a sleeve 260, a radially outwardly extending mount flange 261 at one end of sleeve 260, and a radially inwardly extending ceiling 262 at another end of sleeve 260. Upper valve housing 235 includes an outlet tube 263 terminating at outlet opening 233. Upper valve housing 235 also includes a radially inwardly extending interior flange 201 defining an annular seat for limiting upward movement of movable shuttle 250 in an interior region (i.e., shuttle space) 214 formed in sleeve 260 between mount flanges 261 and interior flange 201 as shown best in FIGS. 9 and 11. A sinker chamber 268 is formed in upper valve housing 235 to receive shuttle sinker 252 and conduct metered fumes 28 discharged through variable flow-metering channel 245 to outlet chamber 270 defined in outlet tube 263. In the illustrative embodiment, upper valve housing 235 is a monolithic element made of plastics material.

As suggested in FIGS. 8 and 9, middle valve housing 200 includes a lower portion 202 that mates with lower valve housing 234 and an upper portion extending upwardly from lower valve housing 234 and comprising an inner sleeve 203 coupled to spring mount 238 and an outer sleeve 204 surrounding inner sleeve 203. Inner sleeve 203 interconnects lower portion 202 and stationary partition wall 238 and cooperates with lower portion 202 to define a downwardly opening chamber 205 receiving base 244 of flow restrictor 240 and pressure-responsive lift reducer (e.g., restrictor mover spring) 247 therein as shown best in FIG. 9. In the illustrated embodiment, middle valve housing 200 is a monolithic element made of a plastics material.

Outer sleeve 204 cooperates with inner sleeve 203 and lower portion 202 to define an upwardly opening annular lifter pit 288 sized to receive a lower portion of shuttle lifter 251 as shown best in FIG. 9. Annular lifter pit 288 is configured to terminate at an annular pit floor 202' defined by an upwardly facing surface included in lower portion 202 as shown, for example, in FIGS. 8 and 9. A lower end 275 of shuttle lifter 251 is arranged to engage annular pit floor 202' upon insertion of shuttle lifter 251 into annular lifter pit 288 as shown in FIG. 9.

Middle valve housing 200 further includes a radially outwardly extending annular flange 281 at an outer end of outer sleeve 204. Annular flange 281 of middle valve housing 200 is arranged to mate with mount flange 261 of upper valve housing 235 as shown, for example, in FIG. 9 to couple middle and upper valve housings 200, 235 in fixed relation to one another. Any suitable adhering, welding, joining, or retaining means may be used to mate flange 261, 281 (or other suitable portions of housings 200, 235) to one another.

As suggested in FIGS. 8 and 9, lower valve housing 234 includes an annular flange 207 that is configured to mate with a downwardly facing end of lower portion 202 of middle valve housing 200 to couple middle and lower valve housings 200, 234 in fixed relation to one another. Any suitable adhering, welding, joining, or retaining means may be used to mate lower portion 202 (or other suitable portion of middle valve housing 200) to flange 207 (or other suitable portion of lower valve housing 235).

Lower valve housing 234 also includes an inlet tube 208 extending downwardly from annular flange 207 and providing inlet 232 for receiving fumes 27 from crankcase 14. Annular flange 207 is formed to include an orifice 209 as shown, for example, in FIG. 9 for conducting crankcase fumes 27 from an interior region formed in inlet tube 208 into chamber 205 formed in middle valve housing 200. In the illustrative embodiment lower valve housing 234 is a monolithic element made of a plastics material.

Movable shuttle 250 is a round disk or washer element formed to include an annular upper end 276 arranged to abut a lower portion 271 of temperature-activated shuttle sinker 252 and an annular lower end 277 arranged to abut an upper end 273 of shuttle lifter 251 as suggested in FIGS. 8 and 9. Movable shuttle 250 is arranged to lie above annular lifter pit 288 and is interposed between shuttle lifter 251 and temperature-activated shuttle sinker 252. Thus, movable shuttle 250 is mounted for up-and-down movement in a shuttle space 214 provided in shell 231 between (1) a lowered "hot-engine" position engaging an annular shuttle stop 272 provided by an upwardly facing surface on spring mount wall 238 as shown, for example, in FIGS. 10 and 12 when a "hot engine" condition 79 exists and high-temperature fuel vapor 27" is discharged from engine crankcase 14 into inlet chamber 290 provided in tube 208 and (2) a raised "cold-engine" position engaging interior flange 201 as shown, for example, in FIGS. 9 and 11 when a "cold engine" condition 78 exists and low-temperature fuel vapor 27' is discharged from engine crankcase 14 into inlet chamber 290. This up-and-down movement of movable shuttle 250 contrasts with the up-and-down movement of movable shuttle 50 of FIGS. 2-6 wherein movable shuttle 50 moves downwardly to a lowered cold-engine position when cold engine condition 78 exists as shown in FIGS. 3 and 5 and moves upwardly to a raised hot-engine position when hot engine condition 79 exists as shown in FIGS. 4 and 6.

Shuttle sinker 252 is a temperature-activated memory element made of, for example, a shape-memory alloy such as a nickel-titanium (nitinol) alloy. Shuttle sinker 252 is annealed originally to an austenitic state to assume a preset lengthened coiled shape as shown, for example, in FIGS. 10 and 12. Shuttle sinker 252 is then cooled to a martensitic state and compressed to assume a shortened coiled shape as shown, for example, in FIGS. 9 and 11. Whenever shuttle sinker 252 is heated thereafter to a predetermined transitional temperature specified for the shape-memory alloy used to make shuttle sinker 252 (as by exposure to high-temperature crankcase fumes 27"), shuttle sinker 252 then will move (e.g., lengthen or expand) in sinker chamber 268 and shuttle space 214 to assume its pre-set lengthened coiled shape as suggested in FIGS. 10 and 12.

An upper portion 269 of temperature-activated shuttle sinker 252 abuts an underside of ceiling 262 while a lower portion 271 of temperature-activated shuttle sinker 252 abuts annular upper end 276 of movable shuttle 250. Movable shuttle 250 is interposed between overlying shuttle sinker 252 and underlying shuttle lifter 251 as shown, for example, in FIG. 9.

Shuttle lifter 251 is an over-ride spring made of a yieldable spring material. In the illustrated embodiment, shuttle lifter 251 is a coiled compression spring located in annular lifter pit 288 provided in middle valve housing 200. Shuttle lifter 251 has a spring constant selected to apply an upward force to urge movable shuttle 250 to move upwardly in shell 231 to "override" and compress temperature-activated shuttle sinker 252 to cause shuttle sinker 252 to move to assume its cooled martensitic state as shown, for example, in FIGS. 9 and 11. However, whenever shuttle sinker 252 is heated to its predetermined transitional temperature, then shuttle sinker 252 will move to assume its preset lengthened or expanded coiled shape as shown, for example, in FIGS. 10 and 12 and move shuttle 250 downwardly to compress coiled shuttle lifter 251 located in middle valve housing 200 underneath movable shuttle 250.

Pressure-responsive lift reducer 247 in the illustrated embodiment provides means for moving (or allowing movement of) flow restrictor 240 in flow-metering orifice 239 formed in movable shuttle 250 in response to changing flow rate of fumes 27 through PCV valve 10. In the illustrated embodiment, lift reducer 247 includes a coiled restrictor mover spring 256 as shown in FIG. 8. Restrictor mover spring 256 is a coiled compression spring having an upper end 255 arranged to engage an underside of spring mount 238 and a lower end 257 arranged to engage base 244 provided on flow restrictor 240 normally to urge flow restrictor 240 in a downward direction toward lower valve housing 234. Restrictor mover spring 256 is arranged to wind around flow restrictor 240 and lie in chamber 205 defined by inner sleeve 203 as shown in FIG. 9.

Flow restrictor 240 is arranged to "float" freely in an interior region 236 of shell 231 in that it is not connected permanently to restrictor mover spring 256. The position (i.e., elevation) of flow restrictor 240 in shell 231 is a function of the vacuum applied by engine intake manifold 16 to outlet chamber 270 formed in tube 263. In other words, a pressure difference above and below flow restrictor 240 created by flow of fumes into engine intake manifold 16 causes flow restrictor 240 to float in interior region 236 of shell 231 and move up and down somewhat in flow-metering orifice 239 formed in movable shuttle 250 regardless of the location of shuttle 250 in shuttle space 214.

Upper valve housing 235 includes a mount flange 261 sized and located to mate with a mount flange 281 in middle valve housing 200 (using any suitable method) to form an "upper section" of shell 231. Once mated, upper and middle valve housings 235, 200 cooperate to form an interior region containing flow restrictor 240, temperature-responsive position changer 246 comprising movable shuttle 250, shuttle lifter 251, and temperature-activated shuttle sinker 252, and pressure-responsive lift reducer 247 comprising spring mount 238 and a coiled restrictor mover spring 256.

Flow restrictor 240 includes a plurality of differently sized control portions which are positionable in orifice 239 to vary flow through flow-metering channel 245, depending upon which control portion is positioned in orifice 239 as shown, for example, in FIGS. 9-12. Illustratively, flow restrictor 240 includes first, second, and third cylindrical control portions 241, 242, 243 and first and second transition control portions 341, 342, which transition control portions have a generally frustoconical shape as shown in FIG. 8. Control portions 244, 341, 242, 342, 243 are aligned along axis 100. First transition control portion 341 interconnects first and second cylindrical control portions 241, 242. Second transition control portion 342 interconnects second and third cylindrical control portions 242, 243. First cylindrical control portion 241 has a first diameter. Second cylindrical control portion 242 has a second diameter larger than the first diameter. Third cylindrical control portion 243 has a third diameter larger than the second diameter. First transition control portion 341 has a fourth diameter which increases as control portion 341 extends axially from first cylindrical control portion 241 to second cylindrical control portion 242. Second transition control portion 343 has a fifth diameter which increases as control portion 343 extends axially from second cylindrical control portion 242 to third cylindrical control portion 243.

In illustrative embodiments, flow restrictor locator means 211 includes a temperature-responsive position changer 246 comprising a movable shuttle 250, a shuttle lifter 251 acting against a bottom side 277 of movable shuttle 250, and a temperature-activated shuttle sinker 252 acting against a top side 276 of movable shuttle 250. Movable shuttle 250 is associated with flow restrictor 240 and is constrained to move up and down in a shuttle space 214 defined in the interior region 236 of shell 231. Flow restrictor 240 is positioned relative to movable shuttle 250 so that "sinking" (i.e., lowering) shuttle 250 in the shuttle space 214 provided in shell 231 causes flow restrictor 240 to move in flow-metering orifice 239 formed in movable shuttle 250 to vary the flow rate of metered fumes 48 discharged from PCV valve 10 to engine intake manifold 16 coupled to PCV valve 10. "Lifting" (i.e., raising) shuttle 250 in the shuttle space 214 provided in shell 231 allows flow restrictor 240 to move upwardly in flow-metering orifice 239 formed in movable shuttle 250 again to vary the flow rate of metered fumes 28 discharged from PCV valve 210 to engine intake manifold 16.

Flow restrictor 240 is arranged to extend through a restrictor-receiving orifice 253 formed in spring mount 238 and also through flow-metering orifice 239 formed in movable shuttle 250. In the illustrated embodiment, the inner diameter of restrictor-receiving orifice 253 is larger than the inner diameter of flow-metering orifice 239. Flow restrictor 240 moves up and down in that restrictor-receiving orifice 253 relative to movable shuttle 250 (and also moves up and down in flow-metering orifice 239) in response to a change in the flow rate of crankcase fumes 27 flowing through shell 231.

Temperature-activated shuttle sinker 252 is a temperature-activated memory element made of a shape-memory alloy such as nitinol. Shuttle sinker 252 is arranged to sink shuttle 250 to a lowered cold-engine position in shuttle space 214 of shell 231 when the crankcase fumes 27 are relatively hot and during a hot-engine condition 79 and the shape-memory alloy is heated to change from martensitic (cold) state to an austenitic (hot) state. Shuttle sinker 252 is configured to lie in a coil and is arranged to wind around and in spaced-apart relation to a portion of a flow restrictor 240 as suggested, for example, in FIGS. 7 and 8.

Shuttle lifter 251 is made of a yieldable spring material. Shuttle lifter 251 is arranged to move shuttle 250 upwardly against shuttle sinker 252 to a raised position in shuttle space 214 of shell 231 when crankcase fumes 27 are relatively cold during a cold-engine condition 78 and the shape-memory alloy in shuttle sinker 252 has cooled and returned to the martensitic (cold) state.

Flow restrictor locator means 211 also includes a pressure-responsive lift reducer 247 that includes restrictor mover spring 256 arranged to engage spring mount 238 and configured to react to the engine throttle valve position to move flow restrictor 240 downwardly in flow-metering orifice 239 in response to changing differential pressure conditions between engine intake manifold 16 and engine crankcase 14 that are manifested in interior region 236 of shell 231. In illustrative embodiments, pressure-responsive lift reducer 247 comprises a restrictor mover spring 256 interposed between spring mount 238 and a base 244 on flow restrictor 240. Shuttle lifter 251, movable shuttle 250, and pressure-responsive lift reducer 247 cooperate to provide link means for linking the temperature-activated shuttle sinker 252 to flow restrictor 240 to cause flow restrictor 240 to move in flow-metering orifice 239 and relative to shuttle sinker 252 to flow restrictor 240 to cause flow restrictor 240 to move in flow-metering orifice 239 and relative to shuttle sinker 252 to change the effective size of variable flow-metering channel 245 in response to expansion of the heated temperature-activated shuttle sinker 252. As shown, for example, in FIG. 8, shuttle sinker 252 is located in outlet chamber 270 and pressure-responsive lift reducer 247, 250, 251 is located in inlet chamber 290.

Restrictor mover spring 256 is made of a yieldable spring material and is arranged to act against spring mount 238 to urge flow restrictor 240 downwardly relative to spring mount 238 when crankcase fumes 27 admitted into shell 231 travel through shell 231 at a "relatively low" flow rate when, for example, the engine throttle valve 24 is "wide open" and a low vacuum 149 is applied by the engine intake manifold 16 to outlet 233 of upper valve housing 235. When the engine throttle valve 24 is "at idle" and a high vacuum 151 is applied by engine intake manifold 16 to outlet 233 of upper valve housing 235, the flow rate of crankcase fumes 27 through shell 231 increase to a "relatively high" flow rate and the floating flow restrictor 240 moves upwardly in flow-metering orifice 239 to overcome a downward biasing force applied by restrictor mover spring 256 (so as to compress restrictor mover spring 256) and moves to a different position in shell 231.

In operation, flow restrictor 240 floats and moves to assume various predetermined positions in moving flow-metering orifice 239 to control flow of metered fumes 28 discharged by PCV valve 210 to engine intake manifold 16 as a function of the temperature and pressure of the crankcase fumes 27 extant in shell 231. To account for temperature, shuttle lifter 251 and temperature-activated shuttle sinker 252 cooperate to move shuttle 250 to a predetermined position in shuttle space 214 provided in shell 231. Flow restrictor 240 moves relative to shuttle 250. At the same time, to account for pressure, pressure-activated lift reducer 247 varies the position of flow restrictor 240 relative to shuttle 250 so that flow restrictor 240 has been moved (or allowed to move) to assume a predetermined position in flow-metering orifice 239. Thus, shuttle 250, shuttle lifter 251, temperature-activated shuttle sinker 252, and pressure-activated lift reducer 247 cooperate to relocate flow restrictor 240 in flow-metering orifice 239 in different positions as a function of (1) pressure established by engine throttle valve position (e.g., idle or wide open) and (2) crankcase fume temperature (e.g., cold at cold-engine start and hot during hot-running operation).

Figure 11:
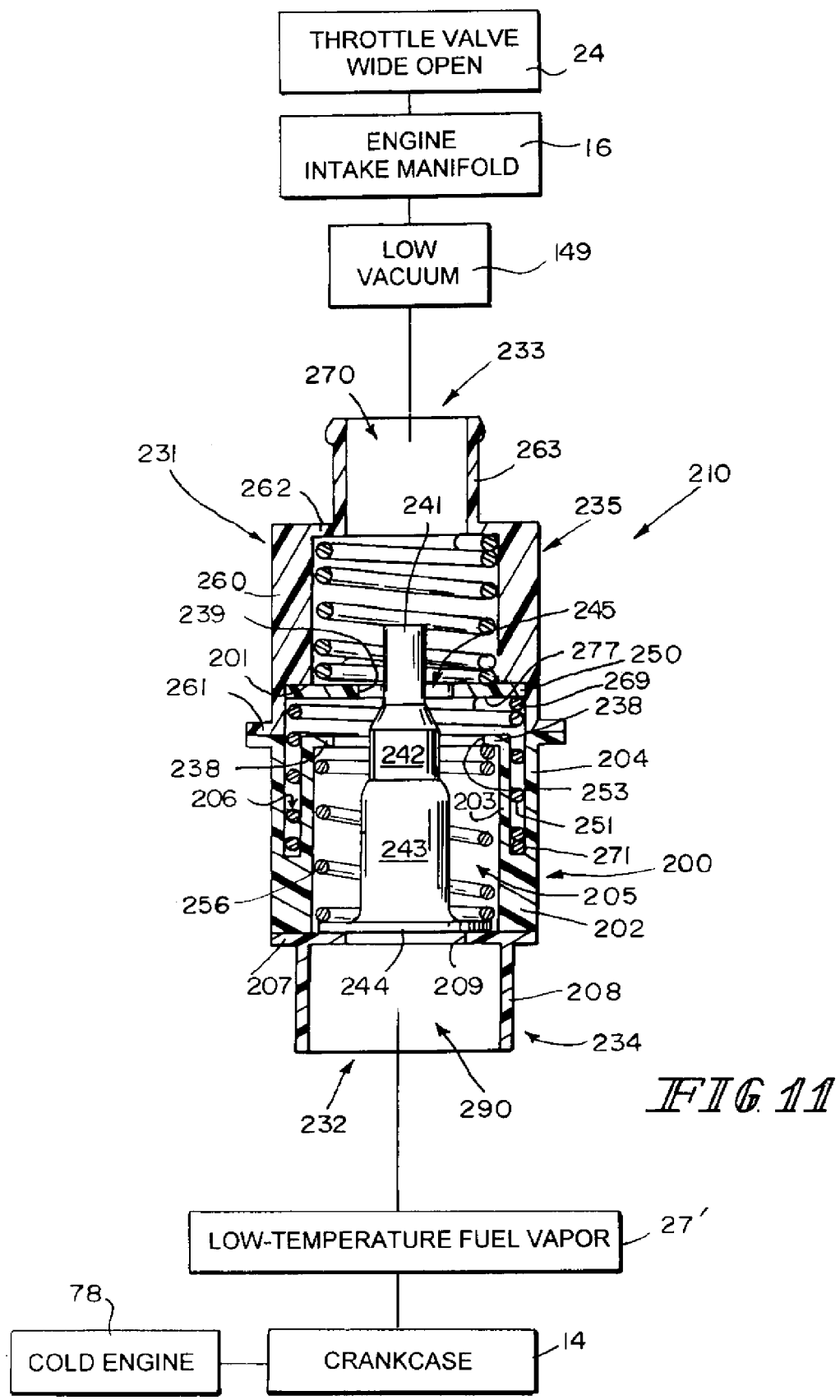

In cold operating conditions, shown, for example, in FIGS. 9 and 11, the temperature-activated shuttle sinker 252 is in its martensitic (i.e., collapsed) state and the spring force generated by shuttle lifter 251 overcomes the spring force generated by temperature-activated shuttle sinker 252, thereby allowing movable shuttle 250 to "operate" on first-stage and second-stage control portions 241, 242 of flow restrictor 240. Sludging and freezing problems are minimized by allowing for high flow rates during cold conditions.

As shown in FIG. 9, PCV valve 210 is placed in a low-temperature idle condition during cold engine condition 78 and high vacuum condition 151. This condition occurs at idle, when throttle valve 14 is partly closed, the need for fuel/air mixture is minimal, blow-by production is low, and vacuum 151 inside engine intake manifold 16 is high. When this happens, flow restrictor 240 in PCV valve 210 gets sucked into flow-metering orifice 239, reducing flow area in variable flow-metering channel 245 and therefore flow through PCV valve 210. Pressure-responsive lift reducer 247 prevents flow restrictor lift reducer 247 prevents flow restrictor 240 from being sucked in completely and is calibrated, in the illustrated embodiment, in such a manner that third-stage control portion 243 of flow restrictor 240 would never travel past flow-metering orifice 239 formed in movable shuttle 250 in cold condition 78.

As shown in FIG. 11, PCV valve 210 is placed in a low-temperature, wide-open throttle condition during old engine condition 78 and low vacuum condition 149. This condition occurs when throttle valve 24 is wide open, when the need for fuel/air mixture is greater, blow-by production is high, and the vacuum in engine intake manifold 16 is low. When this happens, flow restrictor 240 is exposing the smallest diameter of first-stage control portion 241 to flow-metering orifice 239 formed in movable shuttle 250 so as to increase flow area in variable flow-metering channel 245 and therefore the flow through PCV valve 210.

Figure 10:
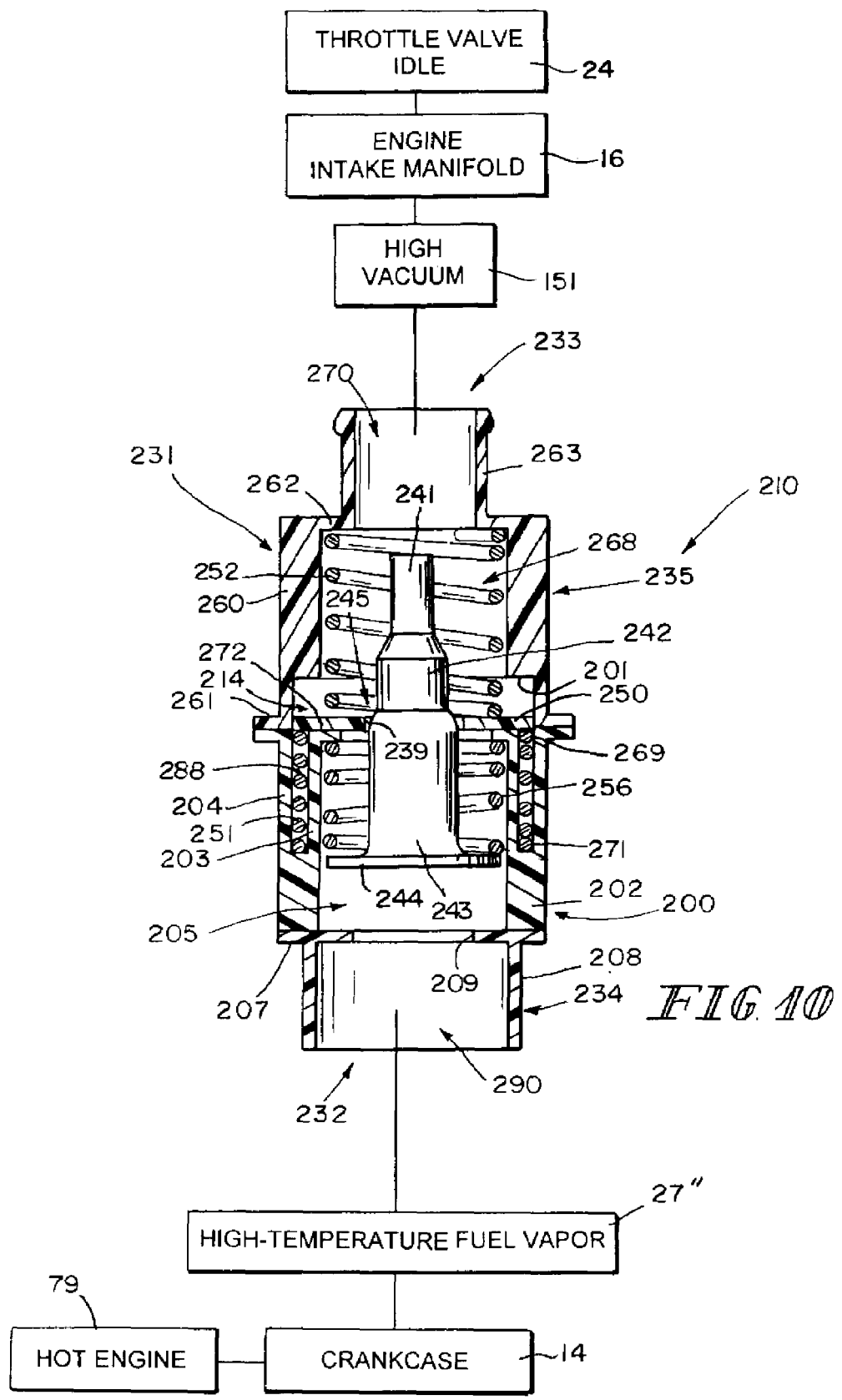
Figure 12:
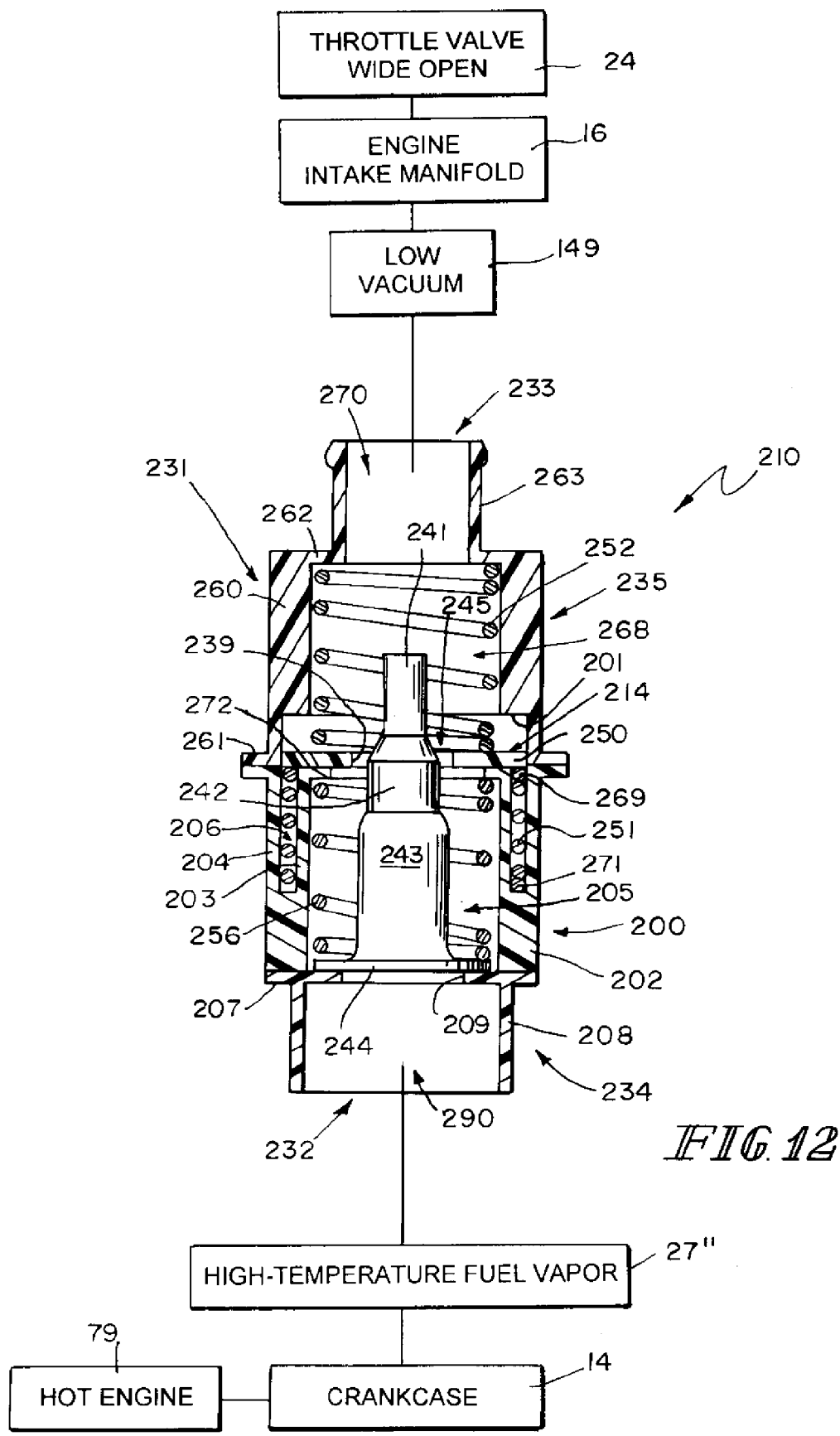

In hot operating conditions, shown, for example, in FIGS. 10 and 12, the temperature-activated shuttle sinker 252 is in its austenitic (actuated) state and the spring force generated by shuttle sinker 252 overcomes the spring force generated by shuttle lifter 25, thereby allowing flow metering orifice 239 in movable shuttle 250 to "operate" on second-stage and third-stage control portions 242, 243 of flow restrictor 240. Oil is conserved by allowing flow rates in hot conditions where sludging and freezing are not as much of a problem. Flow rate through flow-metering orifice 239 is controlled by moving the orifice opening to a position where flow restrictor 248 operates on the second-stage and third-stage control portions 242, 243 during hot operating conditions.

As shown in FIG. 10, PCV valve 210 is placed in a hot-temperature idle condition during hot engine condition 79 and high vacuum condition 151. This condition occurs at idle, when throttle valve 24 is partly closed, the need for fuel/air mixture is minimal, blow-by production is low, and the vacuum in engine intake manifold 16 is high, which creates high flow into engine intake manifold 16. When this happens, flow restrictor 240 gets sucked into flow-metering orifice 239 in movable shuttle 250, reducing the flow area in variable flow-metering channel 245 and therefore the flow through PCV valve 210. Flow restrictor 240 operates on third-stage control portion 243 in hot, low-flow operating conditions. This is achieved by temperature-activated shuttle sinker 252 pushing downwardly against movable shuttle 250 and compressing (i.e., over-riding) shuttle lifter 251.

As shown in FIG. 12, PCV valve 210 is placed in a high-temperature, wide-open throttle condition during hot-engine condition 79 and low vacuum condition 149. This condition occurs when throttle valve 24 is wide open during hot operating conditions, when the need for fuel/air mixture is greater, blow-by production is high, and the vacuum in engine intake manifold 16 is low. when this happens, flow restrictor 240 is exposing second-stage control portion 242 to flow-metering orifice 239 formed in movable shuttle 250, increasing the flow area in variable flow-metering channel 245 and therefore flow through PCV valve 210.

The invention claimed is:

1. A positive crankcase ventilation PCV valve for use with a vehicle engine having a throttle valve movable between an idle position and a wide-open position, the PCV valve comprising a wall providing a flow-metering orifice and a first flow-metering surface bordering the orifice, a shell including a valve housing formed to include an interior region containing the wall, the valve housing including an inlet arranged to open into an inlet chamber provided in the interior region and adapted to be coupled to a crankcase of a vehicle and an outlet arranged to open into an outlet chamber provided in the interior region and adapted to be coupled to an intake manifold of the vehicle, the wall being arranged to lie in the interior region of the valve housing to cause the flow-metering orifice formed in the wall to interconnect the inlet and outlet chambers in fluid communication, a flow restrictor extending into the flow-metering orifice to define a variable flow-metering channel therebetween, the flow restrictor being mounted for movement in the flow-metering orifice to vary an effective size of the variable flow-metering channel between a low-vacuum position located to establish a first effective size of the variable flow-metering channel and supported on a platform included in the shell to extend through the flow-metering orifice in response to exposure of the flow restrictor to a low-level vacuum extant in the outlet chamber when the throttle valve has been moved to the wide-open position and a high-vacuum position located away from and unsupported by the platform to extend through the flow-metering orifice to establish a different second effective size of the variable flow-metering channel in response to exposure of the flow restrictor to a high-level vacuum extant in the outlet chamber that is greater than the low-level vacuum when the throttle valve has been moved to the idle position, and flow restrictor locator means for positioning the flow restrictor in a predetermined position in the flow-metering orifice for a selected temperature and pressure in the interior region of the valve housing to move the flow restrictor to the low-vacuum position in response to development of the low-level vacuum in the outlet chamber and to the high-vacuum position in response to development of the high-level vacuum in the outlet chamber so as to establish a predetermined flow rate of metered fumes discharged from the interior region of the valve housing through the outlet in response to development of the selected temperature and pressure in the interior region of the valve housing.

2. The PCV valve of claim 1, wherein the flow restrictor locator means includes a temperature-activated memory element made of a shape-memory alloy and configured to expand when heated to a predetermined transitional temperature in response to exposure of the temperature-activated memory element to high-temperature fuel vapor admitted into the interior region of the shell through the inlet and link means for linking the temperature-activated memory element to the flow restrictor to cause the flow restrictor to move in the flow-metering orifice and relative to the temperature-activated memory element to change the effective size of the flow-metering channel in response to expansion of the temperature-activated memory element.

3. The PCV valve of claim 2, wherein the temperature-activated memory element is configured to lie in a coil and is arranged to wind around and in spaced-apart relation to a portion of the flow restrictor.

4. The PCV valve of claim 2, wherein both of the temperature-activated memory element and the link means are located in the inlet chamber.

5. The PCV valve of claim 2, wherein the link means is located in the inlet chamber and the temperature-activated memory element is located in the outlet chamber.

6. The PCV valve of claim 1, wherein the flow restrictor includes a base arranged to engage the platform upon movement of the flow restrictor relative to the shell to assume the low-vacuum position and at least two differently sized control portions located between the base of the flow restrictor and the outlet of the shell and arranged to extend into the flow-metering orifice in response to movement of the base toward and away from the platform and wherein the base and the platform cooperate to define an empty space therebetween in response to movement of the flow restrictor to the high-vacuum position.

7. The PCV valve of claim 1, wherein the shell includes a ceiling associated with the outlet and a floor associated with the inlet, the flow restrictor locator means includes a temperature-responsive position changer located in the interior region of the shell, the temperature-responsive position changer includes a movable shuttle mounted for up-and-down movement in the interior region toward and away from the floor and relative to the flow restrictor, a shuttle sinker lying in the interior region above the movable shuttle and including an upper portion engaging the ceiling and a lower portion engaging an upper end of the movable shuttle, and a shuttle lifter lying in the interior region below the movable shuttle and including an upper portion engaging a lower end of the movable shuttle and a lower portion engaging the floor, one of the shuttle sinker and the shuttle lifter is a temperature-activated memory element made of a shape-memory alloy and configured to expand when heated to a predetermined transitional temperature in response to exposure of said one of the shuttle sinker and the shuttle lifter to high-temperature fuel vapor admitted into the interior region of the shell through the inlet to move the movable shuttle relative to the ceiling and floor, and another of the shuttle sinker and the shuttle lifter is an override spring that is made of a yieldable spring material and has a spring constant selected to apply an opposing force to contract said one of the shuttle sinker and the shuttle lifter in response to exposure of said one of the shuttle sinker and the shuttle lifter to a low-temperature fuel vapor that has a temperature that is less than the predetermined transitional temperature and is admitted into the interior region of the shell through the inlet.

8. The PCV valve of claim 7, wherein the flow restrictor locator means further includes a restrictor mover spring lying in the interior region and including a lower end arranged to engage the base and an upper end arranged to engage one of a spring mount coupled to the movable shuttle to move therewith and a shuttle stop included in the shell and interposed between the movable shuttle and the restrictor mover spring to limit downward movement of the movable shuttle toward the inlet.

9. The PCV valve of claim 8, wherein each of the shuttle lifter and the restrictor mover spring is configured to lie in a coil and is arranged to wind around a portion of the flow restrictor.

10. The PCV valve of claim 8, wherein the shell includes an inner sleeve and an outer sleeve arranged to surround the inner sleeve to define an annular lifter pit therebetween containing the shuttle lifter and terminating at the floor and the inner sleeve is interposed between the shuttle lifter and the restrictor mover spring.

11. The PCV valve of claim 10, wherein the shuttle lifter is configured to lie in a coil in the annular lifter pit and to wind around an exterior surface of the inner sleeve.

12. The PCV valve of claim 10, wherein a portion of the movable shuttle is arranged to overlie an annular opening into the annular lifter pit defined between the inner and outer sleeves included in the shell.

13. The PCV valve of claim 1, wherein the shell includes a ceiling associated with the outlet and a floor associated with the inlet, the flow restrictor locator means includes a position changer located in the interior region of the shell, the position changer includes a movable shuttle mounted for up-and-down movement in the interior region toward and away from the floor and relative to the flow restrictor, a shuttle sinker lying in the interior region above the movable shuttle and including an upper portion engaging the ceiling and a lower portion engaging an upper end of the movable shuttle, and a shuttle lifter lying in the interior region below the movable shuttle and including an upper portion engaging a lower end of the movable shuttle and a lower portion engaging the floor.

14. The PCV valve of claim 13, wherein the flow restrictor locator means further includes a restrictor mover spring lying in the interior region and including a lower end arranged to engage the base and an upper end arranged to engage one of a spring mount coupled to the movable shuttle to move therewith and a shuttle stop included in the shell and interposed between the movable shuttle and the restrictor mover spring to limit downward movement of the movable shuttle toward the inlet.

15. The PCV valve of claim 13, wherein the movable shuttle is located between the inlet and the wall providing the flow-metering orifice and formed to include a restrictor-receiving orifice and the flow restrictor is arranged to extend through the restrictor-receiving orifice formed in the movable shuttle.

16. The PCV valve of claim 13, wherein the shuttle lifter is a temperature-activated memory element made of shape-memory alloy and configured to expand when heated to a predetermined transitional temperature in response to exposure of the shuttle lifter to high-temperature fuel vapor admitted into the interior region of the shell through the inlet to move the movable shuttle toward the ceiling and away from the floor and wherein the flow restrictor locator means further includes a spring mount coupled to the movable shuttle for movement therewith and a restrictor mover spring arranged to engage the spring mount and a surface on the flow restrictor to yieldably urge the flow restrictor in a downward direction relative to the movable shuttle in the flow-receiving orifice.

17. The PCV valve of claim 16, wherein the movable shuttle is located between the inlet and the wall providing the flow-metering orifice and formed to include a restrictor-receiving orifice and the flow restrictor is arranged to extend through the restrictor-receiving orifice formed in the movable shuttle.

18. The PCV valve of claim 16, wherein the shuttle sinker is an override spring made of a yieldable spring material and has a spring constant selected to apply an opposing force to apply an opposing force to contract the shuttle lifter to move the movable shuttle toward the floor and away from the ceiling in response to exposure of the shuttle lifter to a low-temperature fuel vapor that has a temperature that is less than the predetermined transitional temperature and admitted into the interior region of the shell through the inlet.

19. The PCV valve of claim 18, wherein the movable shuttle is located between the inlet and the wall providing the flow-metering orifice and is formed to include a restrictor-receiving orifice and the flow restrictor is arranged to extend through the restrictor-receiving orifice formed in the movable shuttle.

20. The PCV valve of claim 13, wherein the movable shuttle includes the wall providing the flow-metering orifice.

21. The PCV valve of claim 13, wherein the shuttle sinker is a temperature-activated memory element made of a shape-memory alloy and configured to expand when heated to a predetermined transitional temperature in response to exposure of the shuttle sinker to high-temperature fuel vapor admitted into the interior region of the shell through the inlet to move the movable shuttle away from the ceiling and toward the floor and wherein the flow restrictor locator means further includes a spring mount coupled to the shell and arranged to lie in the interior region of the shell and a restrictor mover spring arranged to engage the spring mount and a surface on the flow restrictor to yieldably urge the flow restrictor in a downward direction relative to the movable shuttle in the flow-receiving orifice.

22. The PCV valve of claim 21, wherein the movable shuttle includes the wall providing the flow-metering orifice.

23. The PCV valve of claim 21, wherein the shuttle lifter is an override spring made of a yieldable spring material and has a spring constant selected to apply an opposing force to contract the shuttle sinker to move the movable shuttle toward the ceiling and away from the floor in response to exposure of the shuttle lifter to a low-temperature fuel vapor that has a temperature that is less than the predetermined transitional temperature and is admitted into the interior region of the shell through the inlet.

24. The PCV valve of claim 23, wherein the movable shuttle includes the wall providing the flow-metering orifice.

25. A positive crankcase ventilation PCV valve for use with a vehicle engine having a throttle valve movable between an idle position and a wide-open position, the PCV valve comprising a valve housing formed to include an interior region, an inlet arranged to open into an inlet chamber provided in the interior region and adapted to be coupled to a crankcase of a vehicle, and an outlet arranged to open into an outlet chamber provided in the interior region and adapted to be coupled to an intake manifold of the vehicle, the valve housing including a stationary partition wall fixed in the interior region to provide a boundary between the inlet and outlet chambers and formed to include a flow-metering orifice providing a fluid-conducting passageway interconnecting the inlet and ouilet chambers in fluid communication, a flow restrictor arranged in the interior region of the valve housing to extend into the flow-metering orifice to define a variable flow-metering channel between the stationary partition wail and the flow restrictor and to move in the flow-metering orifice to vary an effective size of the variable flow-metering channel, a temperature-responsive position changer located in the interior region of the valve housing, the temperature-responsive position changer including a movable shuttle mounted for up-and-down movement in the inlet chamber, a shuttle sinker having an upper portion engaging a first surface included in the valve housing and a lower portion engaging a top surface of the movable shuttle, and a temperature-activated shuttle lifter having a lower portion engaging a second surface included in the valve housing and an upper portion engaging a bottom surface of the movable shuttle, and a pressure-responsive lift reducer located in the inlet chamber, the pressure-responsive lift reducer including a spring mount coupled to the movable shuttle for up-and-down movement in the inlet chamber therewith and a restrictor mover spring located in the inlet chamber to lie between and engage each of the spring mount and a surface on the flow restrictor and configured to yieldably urge the flow restrictor in a downward direction toward the inlet and away from the spring mount coupled to the movable shuttle, wherein the temperature-activated shuttle lifter is a temperature-activated memory element made of a shape-memory alloy and is configured to expand when heated to a predetermined transitional temperature by high-temperature fuel vapor discharged from the crankcase and admitted into the inlet chamber through the inlet to provide means for using a temperature input associated with fuel vapor discharged from the crankcase into the inlet chamber to move the movable shuttle and spring mount in an upward direction toward the stationary partition wall so that the flow restrictor and the restrictor mover spring are free to move further in an upward direction in the interior region relative to the stationary partition wall and the flow-metering orifice formed therein in response to a differential pressure associated with fuel vapor extant in the interior region of the valve housing and applied in the outlet chamber to a top portion of the flow restrictor and in the inlet chamber to a bottom portion of the flow restrictor and characterized by a pressure in the inlet chamber that is higher than a pressure in the outlet chamber.

26. The PCV valve of claim 25, wherein each of the temperature-activated shuttle lifter and the restrictor mover spring is configured to lie in a coil and is arranged to wind around a portion of the flow restrictor.

27. The PCV valve of claim 26, wherein the valve housing includes an inner sleeve and an outer sleeve arranged to surround the inner sleeve to define an annular lifter pit therebetween containing the shuttle lifter and terminating at the floor and the inner sleeve is interposed between the temperature-activated shuttle lifter and the restrictor mover spring.

28. The PCV valve of claim 27, wherein the movable shuttle is a cylinder-shaped element, the spring mount is coupled to an upper end of the movable shuttle to lie outside of the annular lifter pit defined between the inner and outer sleeves of the shell and is arranged to extend in a radially inward direction to lie and move in a shuttle-movement space provided between the stationary partition wall and a shuttle stop formed on an upper end of the inner sleeve, and the shuttle stop is arranged to engage an underside of the spring mount to limit downward movement of the movable shuttle in the annular lifter pit.

29. The PCV valve of claim 25, wherein the shuttle sinker is a coiled compression spring.

30. The PCV valve of claim 29, wherein the valve housing includes an inner sleeve and an outer sleeve arranged to surround the inner sleeve and to cooperate with the first surface of the valve housing to define a sinker chamber receiving a portion of the shuttle sinker.

31. A positive crankcase ventilation PCV valve for use with a vehicle engine having a throttle valve movable between an idle position and a wide-open position, the PCV valve comprising a valve housing formed to include an interior region, an inlet arranged to open into an inlet chamber provided in the interior region and adapted to be coupled to a crankcase of a vehicle, and an outlet arranged to open into an outlet chamber provided in the interior region and adapted to be coupled to an intake manifold of the vehicle, a temperature-responsive position changer located in the interior region of the valve housing, the temperature-responsive position changer including a movable shuttle mounted for up-and-down movement in the inlet chamber, a temperature-activated shuttle sinker having an upper portion engaging a first surface included in the valve housing and a lower portion engaging a top surface of the movable shuttle, and a shuttle lifter having a lower portion engaging a second surface included in the valve housing and an upper portion engaging a bottom surface of the movable shuttle, the movable shuttle being formed to include a flow-metering orifice providing a fluid-conducting passageway interconnecting the inlet and outlet chambers in fluid communication, a flow restrictor arranged in the interior region of the valve housing to extend into the flow-metering orifice formed in the movable shuttle to define a variable flow-metering channel between the movable shuttle and the flow restrictor and to move in the flow-metering orifice to vary an effective size of the variable flow-metering channel, and a pressure-responsive lift reducer located in the inlet chamber, the pressure-responsive lift reducer including a spring mount coupled to the valve housing and a restrictor mover spring located in the inlet chamber to lie between and engage each of the spring mount and a surface on the flow restrictor and configured to yieldably urge the flow restrictor in a downward direction toward the inlet and away from the spring mount coupled to the valve housing, wherein the temperature-activated shutter sinker is a temperature-activated memory element made of a shape-memory alloy and is configured to expand when heated to a predetermined transitional temperature by high-temperature fuel vapor discharged from the crankcase and admitted into the inlet chamber through the inlet to provide means for using a temperature input associated with fuel vapor discharged from the crankcase into the inlet chamber to move the movable shuttle in a downward direction toward the spring mount to vary the location of the flow restrictor in the flow-receiving orifice formed in the movable shuttle so that the flow restrictor is free to move in an upward direction in the interior to compress the restrictor mover spring between the spring mount and the surface on the flow restrictor to further vary the location of the flow restrictor in the flow-receiving orifice formed in the movable shuttle in response to a differential pressure associated with fuel vapor extant in the interior region of the valve housing and applied in the outlet chamber to a top portion of the flow restrictor and in the inlet chamber to a bottom portion of the flow restrictor and characterized by a pressure in the inlet chamber that is higher than a pressure in the outlet chamber.

32. The PCV valve of claim 31, wherein each of the shuttle lifter and the restrictor mover spring is configured to lie in a coil and is arranged to wind around a portion of the flow restrictor.

33. The PCV valve of claim 32, wherein the valve housing includes an inner sleeve and an outer sleeve arranged to surround the inner sleeve to define an annular lifter pit therebetween containing the shuttle lifter and terminating at the floor and the inner sleeve is interposed between the shuttle lifter and the restrictor mover spring.

34. The PCV valve of claim 33, wherein the spring mount is coupled to the inner sleeve and arranged to lie in spaced-apart relation to an interior flange included in the valve housing to define a shuttle-movement space therebetween, the shuttle lifter is configured normally to yieldably urge the movable shuttle in an upward direction toward the outlet to engage the interior flange, and the spring mount includes an upwardly facing surface arranged to engage an underside of the movable shuttle to limit downward movement of the movable shuttle in the shuttle-movement space during expansion of the temperature-activated memory element defining the temperature-activated shuttle sinker.

35. The PCV valve of claim 31, wherein the spring mount is arranged to lie in spaced-apart relation to an interior flange included in the valve housing to define a shuttle-movement space therebetween, the shuttle lifter is configured normaily to yieldably urge the movable shuttle in an upward direction toward the outlet to engage the interior flange, the spring mount includes an upwardly facing surface arranged to engage an underside of the movable shuttle to limit downward movement of the movable shuttle in the shuttle-movement space during expansion of the temperature-activated memory element defining the temperature-activated shuttle sinker, and the spring mount further includes a downwardly facing surface arranged to engage the restrictor mover spring.

36. The PCV valve of claim 31, wherein each of the temperature-activated shuttle sinker and the restrictor mover spring is configured to lie in a coil and arranged to wind around a portion of the flow restrictor.

37. The PCV valve of claim 36, wherein the restrictor mover spring is configured to lie in a coil and arranged to wind around a portion of the flow restrictor.

* * * * *